(12) United States Patent
Flowers

(10) Patent No.: US 8,622,160 B2
(45) Date of Patent: Jan. 7, 2014

(54) MOVEABLE STEERING AND UNIVERSAL CHARGER

(75) Inventor: Michael J. Flowers, Mantua, NJ (US)

(73) Assignee: Flowers IP LLC, Sewell, NJ (US)

( * ) Notice: Subject to any disclaimer, the term of this patent is extended or adjusted under 35 U.S.C. 154(b) by 118 days.

(21) Appl. No.: 13/385,706

(22) Filed: Mar. 2, 2012

(65) Prior Publication Data

US 2013/0175103 A1 Jul. 11, 2013

Related U.S. Application Data

(60) Provisional application No. 61/464,471, filed on Mar. 3, 2011, provisional application No. 61/519,314, filed on May 20, 2011.

(51) Int. Cl.
*B60K 1/00* (2006.01)

(52) U.S. Cl.
USPC ......... 180/65.1; 180/65.29; 180/907; 74/491; 439/476.1

(58) Field of Classification Search
USPC ............ 74/491; 180/6.5, 78, 19.3, 65.1, 6.48, 180/320, 321–323, 326, 334, 907, 304.1; 439/476.1
See application file for complete search history.

(56) References Cited

U.S. PATENT DOCUMENTS

| | | | | |
|---|---|---|---|---|
| 4,947,955 A * | 8/1990 | Hopely, Jr. | ..................... | 180/216 |
| 5,125,468 A * | 6/1992 | Coker | .............................. | 180/13 |
| 5,238,082 A * | 8/1993 | Stegeman et al. | ............. | 180/208 |
| 5,306,156 A * | 4/1994 | Gibbs et al. | ..................... | 439/34 |
| 5,435,404 A * | 7/1995 | Garin, III | ....................... | 180/6.5 |
| 5,651,422 A * | 7/1997 | Casali | .............................. | 180/13 |
| 5,927,414 A * | 7/1999 | Kan et al. | ...................... | 180/19.3 |
| 6,159,019 A * | 12/2000 | Norizuki et al. | ................ | 439/34 |
| 6,450,834 B1 * | 9/2002 | Polgar et al. | .................... | 439/546 |
| 6,695,081 B2 * | 2/2004 | Chu et al. | ..................... | 180/65.1 |
| 6,910,543 B2 * | 6/2005 | Kanno et al. | ................. | 180/65.1 |
| 6,979,229 B1 * | 12/2005 | Liao et al. | ..................... | 439/660 |
| 7,661,961 B2 * | 2/2010 | Brinkhous et al. | .............. | 439/35 |
| 8,113,305 B1 * | 2/2012 | Flowers et al. | ............. | 180/19.1 |
| 8,118,120 B2 * | 2/2012 | Flowers et al. | ............. | 180/19.1 |
| 2002/0053778 A1 * | 5/2002 | Howard | ........................ | 280/252 |
| 2003/0127261 A1 * | 7/2003 | Borroni-Bird et al. | ...... | 180/65.1 |
| 2003/0192728 A1 * | 10/2003 | Richey et al. | ................. | 180/204 |
| 2007/0080003 A1 * | 4/2007 | Koerlin et al. | ............. | 180/65.1 |
| 2011/0011652 A1 * | 1/2011 | Swenson | ..................... | 180/9.23 |
| 2012/0166020 A1 * | 6/2012 | Mattes et al. | ..................... | 701/1 |

* cited by examiner

*Primary Examiner* — John Walters
*Assistant Examiner* — James Triggs
(74) *Attorney, Agent, or Firm* — Frijouf, Rust & Pyle P.A.

(57) ABSTRACT

A universal steering and charger system is disclosed for a dual motor vehicle comprising a socket having socket terminals. A coupling defines a socket insert having socket insert terminals. A sensor is connected to the socket insert terminals with a hand control enabling an operator to manipulate the sensor. The socket insert is receivable within the socket for electrically connecting the socket insert to the socket. A motor drive control is connected to the socket for powering the first and second motors from a storage battery for steering the dual motor vehicle. A mast has mast terminals connected to a low voltage power source. The coupling is removable from the socket for enabling insertion of the mast into the socket for charging the storage battery. A plurality of sockets may be mounted at multiple location on the dual motor vehicle for steering the dual motor vehicle from multiple locations on the dual motor vehicle. The mast of the charging system may be utilized for charging a variety of electrical device.

16 Claims, 35 Drawing Sheets

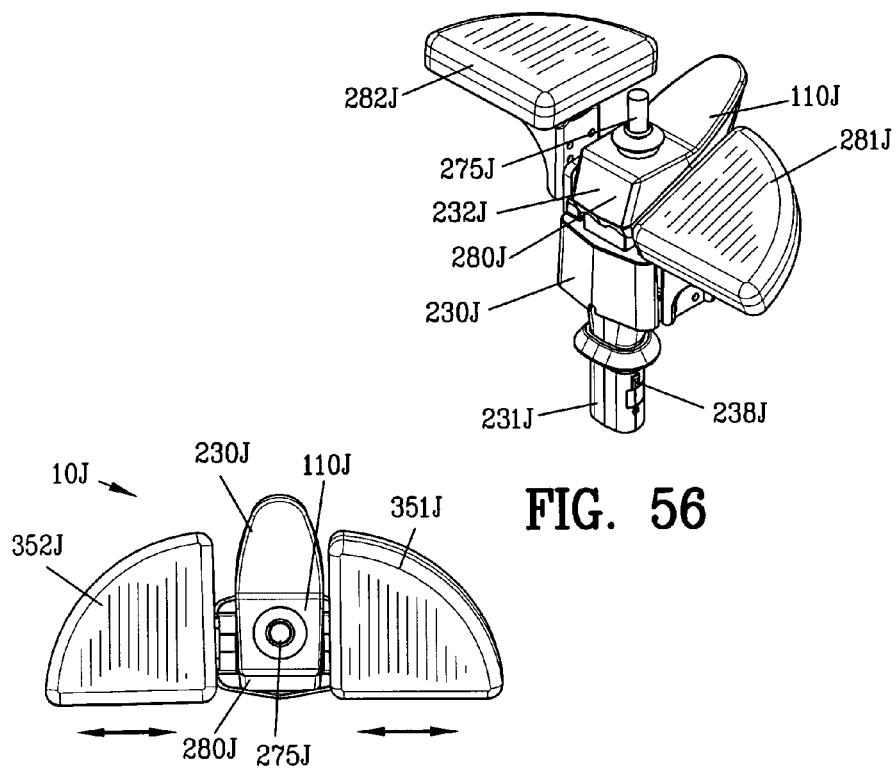
FIG. 56
FIG. 57
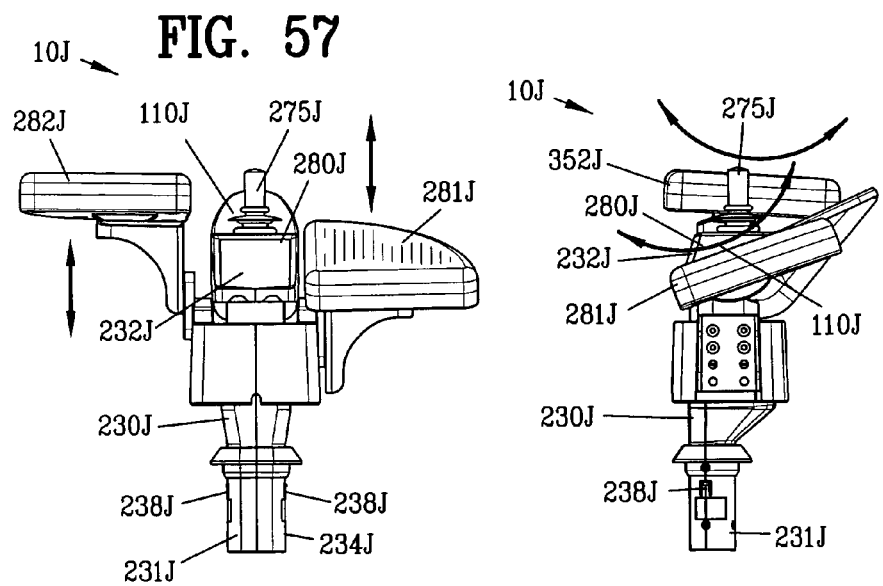
FIG. 58
FIG. 59

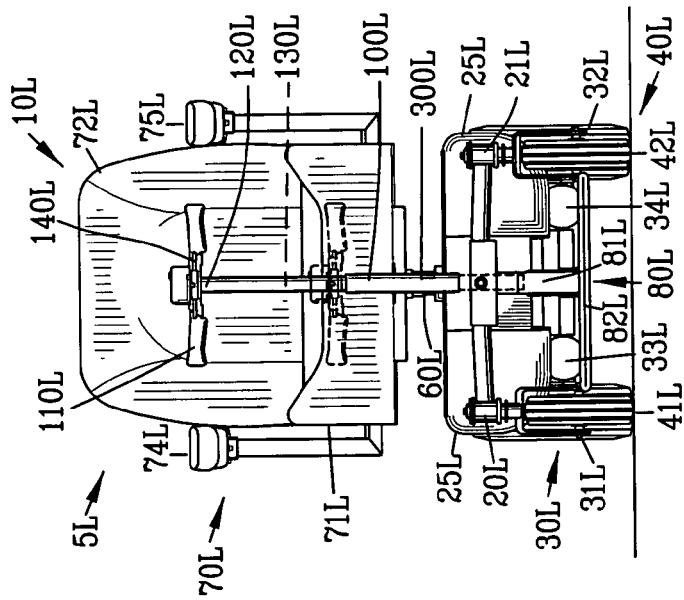
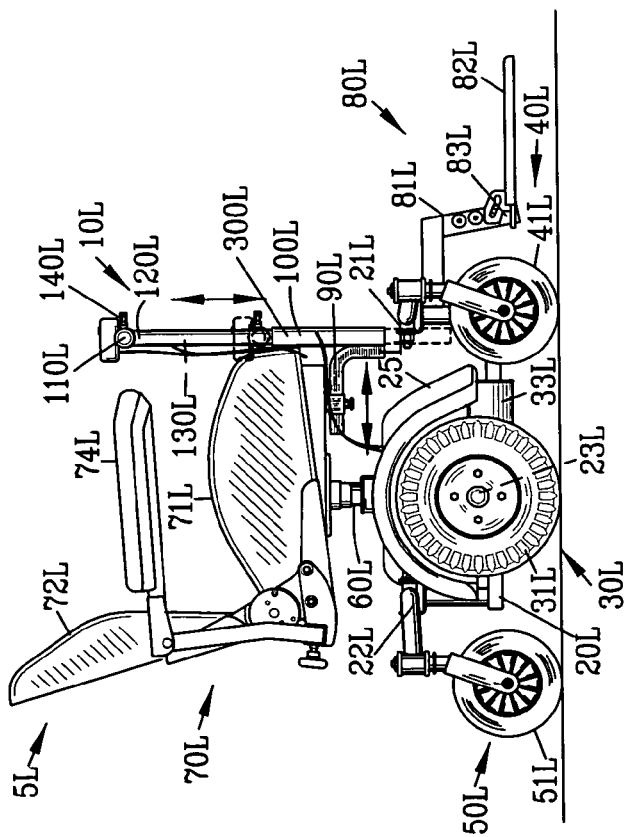
FIG. 69
FIG. 68

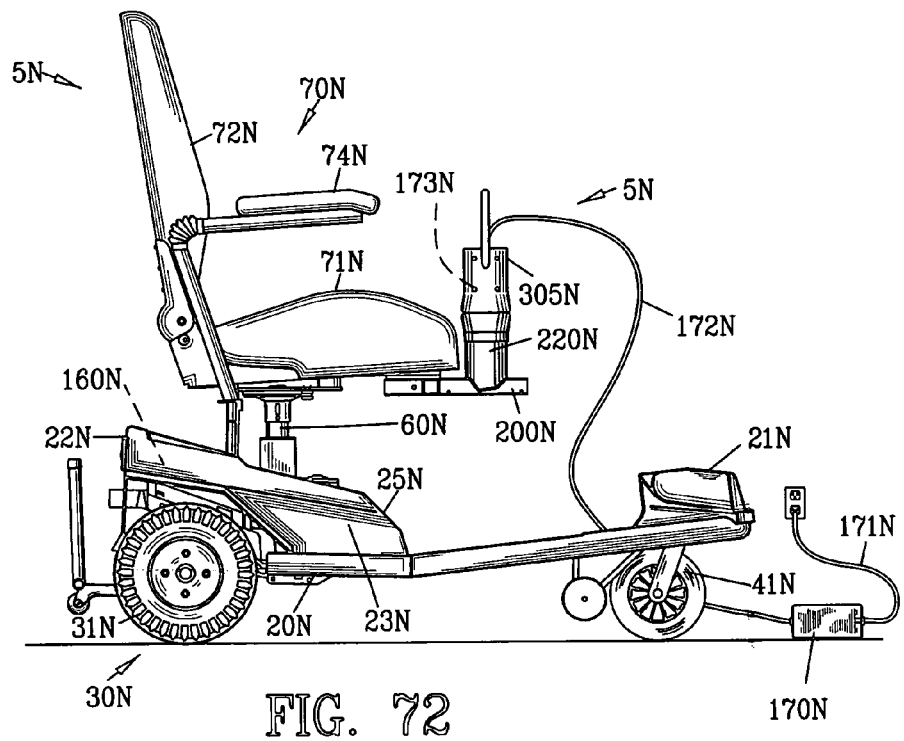
FIG. 72
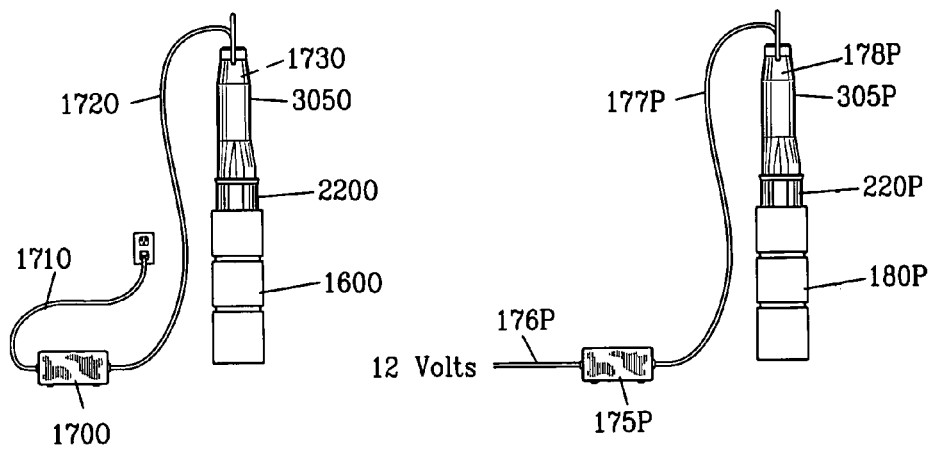
FIG. 73
FIG. 74

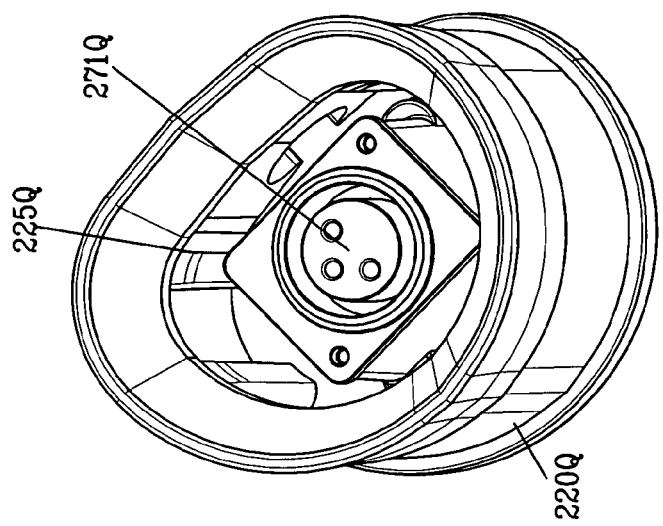
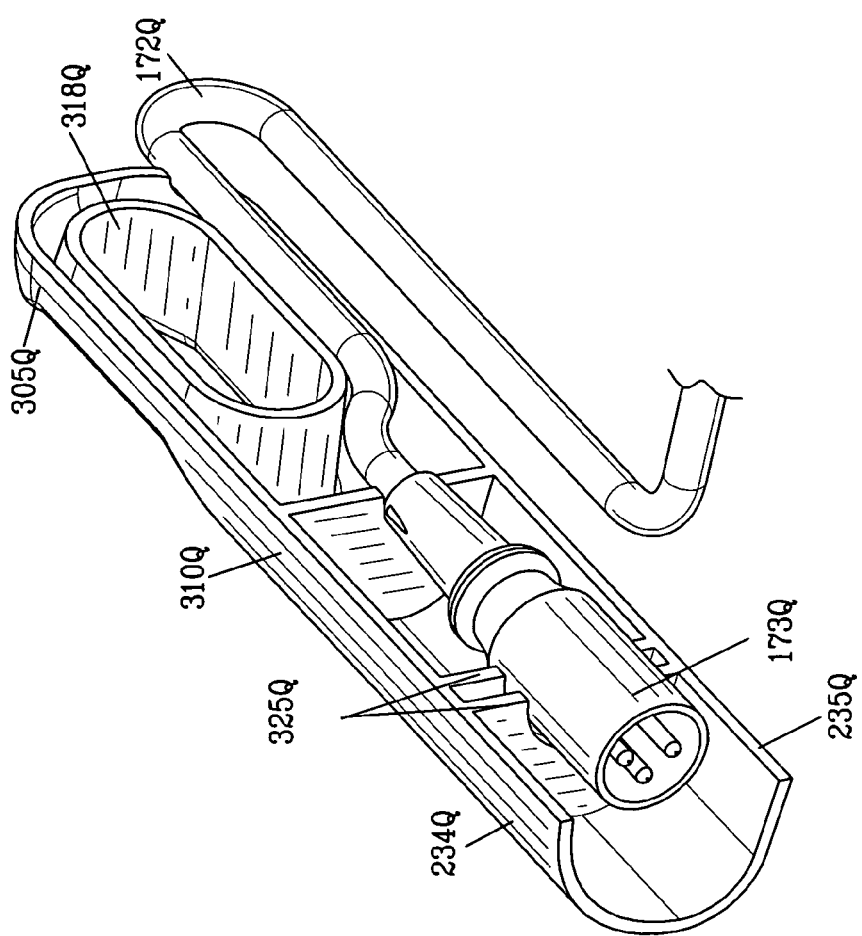

MOVEABLE STEERING AND UNIVERSAL CHARGER

CROSS-REFERENCE TO RELATED APPLICATIONS

This application claims benefit of U.S. provisional application No. 61/464,471 filed Mar. 3, 2011 and U.S. provisional application No. 61/519,314 filed May 20, 2011. All subject matter set forth in provisional application Ser. No. 61/464,471 and 61/519,314 is hereby incorporated by reference into the present application as if fully set forth herein.

BACKGROUND OF THE INVENTION

1. Field of the Invention

This invention relates to electric devices including electric vehicles and more particularly to a steering control and universal charger removably received within a socket in a dual motor vehicle. The universal charger may be utilized in a variety of electric devices.

2. Description of the Related Art

Personal mobility vehicles may be characterized as either scooter type personal mobility vehicles or power wheelchair (power chair) type personal mobility vehicles. Each of the scooter type personal mobility vehicles and the power chair type personal mobility vehicles have certain advantages and disadvantages.

A scooter type personal mobility vehicle typically comprises an elongated frame having front single or plural steering wheels and plural rear drive wheels. The front single or plural steering wheels are pivotably mounted on the front portion of the elongated frame. A handlebar is provided for pivoting the front single or plural steering wheels for steering the personal mobility vehicle.

The plural rear wheels are mounted on independent axially aligned shafts driven by a single electric motor though a differential gearbox. The electric motor is controlled by an electronic controller and a speed, braking and forward/reverse engager located on the handlebar of the scooter. The scooter type personal mobility vehicle is well suited for unconfined areas such as outside use due to the superior ride of the elongated wheelbase of the scooter. The elongated wheelbase provides more stability and a better ride for the scooter type personal mobility vehicle.

A power chair type personal mobility vehicle typically comprises a short frame having plural drive wheels and plural caster wheels. The plural drive wheels may be located in the front, center or the rear drive of the power chair type personal mobility vehicle. Plural caster wheels complement the plural drive wheels of the power chair type personal mobility vehicle.

The plural drive wheels are independently driven by plural electric motors. Each of the plural electric motors is independently controlled by a dual motor controller for independently driving the plural electric motors.

Typically, a joystick is mounted on an armrest of a power chair type personal mobility vehicle for controlling the first and second drive motors. The joystick operates both the steering as well as the speed, braking and forward/reverse movements of the power chair. The steering of the power chair is accomplished by a differential in speed between the plural independently driven electric motors including the reverse rotation of one of the electric motors relative to the other of the electric motors to turn the power chair. The power chair type personal mobility vehicle is well suited for confined areas such as inside use due to the short frame and the superior turning radius of the plural independently driven electric motors. The short wheelbase and the ability to reverse one motor relative to the other motor provides a reduced turning radius for the personal mobility vehicle for negotiating smaller confined spaces indoors.

The basic commands for driving both types of personal mobility vehicles are forward, backward; turn left or turn right; faster or slower; and stop. Unfortunately, the manipulation of a joystick of a power chair to control the multiple functions of steering, propulsion and braking is not intuitive or obvious to a new user or a cognitively impaired user. Many new users find it difficult to operate a power chair type personal mobility vehicle due to the lack of prior experience using a single interface joystick device that combines steering, turning, speed, braking and forward/reverse controls. In contrast, the manipulation of the handlebar in a scooter type personal mobility vehicle with independent drive controls is intuitively obvious to a new user. The intuitively obviousness is due to past experience operating tricycles, bicycles and automobiles with independent steering and drive controls.

Furthermore, most power chairs and mobility scooters come with a small high frequency stand alone (off board) battery charger with output ratings from 1.5 to 6.0 amperes depending upon the size of the batteries installed on the vehicle. Approximately ninety percent (90%) of mobility vehicles are provided with a small lightweight high frequency battery charger kept off board of the devices. Millions of these mobility enhancing vehicles are used by the elderly and people with disabilities all over the world.

Charging the batteries of these vehicles is critical to maintain the function of the mobility vehicle and allow people to perform their daily activities utilizing the mobility vehicle. Occupational Therapists, Physical Therapists, Rehabilitation Professionals and other Medical Professionals require patients who live alone to demonstrably prove the patients are able to charge the batteries of electric vehicles prior to authorizing the mobility device for reimbursement or purchase by Medicare, Private Insurers and the Veterans Administration.

Successfully plugging in a small one-half inch round plug of a battery charger into a round socket located on a vertical wall on a joystick hand control on a power chair or on the battery box or plastic shroud of a mobility scooter may be difficult or impossible for most people with disabilities. Consequently, conscientious medical professionals do not authorize acquisition of these powered mobility vehicles for these disabled patients. Unfortunately, these immobile patients are often placed in a Nursing Home at great financial and emotional costs to the individual, simply because the immobile patients are unable to insert a battery charger power plug into a corresponding socket.

In my invention set forth in U.S. Pat. No. 8,132,634 filed Jul. 24, 2009, I disclose an electronic steering assembly for a dual motor vehicle having a handlebar rotatably mounted relative to a base for steering the dual motor vehicle through the rotational movement of the handlebar.

It is an object of the present invention to improve upon my prior invention set forth in U.S. Pat. No. 8,132,634 by providing a movable hand control receivable at various locations of the motor vehicle.

It is a further object of the present invention to an improved electrical connector which is easy for physically impaired persons to connect.

Another object of the invention is to provide a moveable steering control that is removably received within a socket in a dual motor vehicle for steering the dual motor vehicle.

Another object of the invention is to provide a universal charger that is removably received within a socket in a dual motor vehicle for charging the dual motor vehicle.

Another object of the invention is to provide a moveable steering control that is removably received within one of a plurality of sockets located about a dual motor vehicle for steering the dual motor vehicle from various locations about a dual motor vehicle.

Another object of the invention is to provide a movable steering control incorporating an independent speed and forward-reverse controls that separates the physical movements necessary to steer the dual motor vehicle from the physical movements necessary to control the speed and forward-reverse control of the dual motor vehicle so the operation of the dual motor vehicle is intuitively obvious to a new user or a cognitively impaired user.

Another object of the invention is to provide a movable hand control that is applicable to either a power chair type personal mobility vehicle or a scooter type personal mobility vehicle.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the present invention, the invention is incorporated into a universal steering and charger system for a dual motor vehicle. The dual motor vehicle has a first and a second motor for driving a first and a second drive wheel from a storage battery. The universal steering and charger system comprises a socket having socket terminals located on the dual motor vehicle. A coupling defines a socket insert having socket insert terminals. A sensor is located within the coupling connected to the socket insert terminals. A hand control is secured to the coupling for enabling an operator to manipulate the sensor. The socket insert is receivable within the socket for electrically connecting the socket insert terminals to the socket terminals. A motor drive control is connected to the socket terminals for powering the first and second motors from the storage battery in accordance with the manipulation of the sensor for steering the dual motor vehicle. A mast has mast terminals connected to a low voltage power source. The coupling is removable from the socket for enabling insertion of the mast into the socket for electrically connecting the mast terminals to the socket terminals for charging the storage battery.

In a more specific embodiment, the hand control may comprise a handlebar, a joystick or a chin control. The socket may include a plurality of sockets mounted at multiple locations on the dual motor vehicle.

In another embodiment of the invention, the invention is incorporated into a moveable hand control for a dual motor vehicle. The invention comprises a plurality of sockets, each having socket terminals mounted at multiple locations on the dual motor vehicle. A coupling defines a socket insert having socket insert terminals. A sensor is located within the coupling and is connected to the socket insert terminals. A hand control is secured to the coupling for enabling an operator to manipulate the sensor. The socket insert is receivable within one of the plurality of sockets for electrically connecting the socket insert terminals to the socket terminals for powering the first and second motors in accordance with the manipulation of the sensor for steering the dual motor vehicle from multiple locations on the dual motor vehicle.

In a more specific embodiment, the hand control is adapted to be mounted relative to a frame of the dual motor vehicle. In the alternative, the hand control is adapted to be mounted relative to a seat of the dual motor vehicle. The hand control may be adapted to be mounted in front of a seat of the dual motor vehicle for enabling an occupant to control the dual motor vehicle. Conversely, the hand control may be adapted to be mounted behind a seat of the dual motor vehicle for enabling an attendant to control the dual motor vehicle. An independent drive control is located on the handlebar for controlling the speed, braking and the forward/reverse direction of the dual motor vehicle.

In another embodiment of the invention, the invention is incorporated into a universal low voltage electrical connector for facilitating connection of a low voltage power source to an electrical device. The universal low voltage electrical connector comprises a socket having a recess defined in the socket. A plurality of exposed socket terminals are located in the recess. A plurality of socket conductors interconnects the plurality of exposed conductors to the electrical device. A mast extends between a lower portion and an upper portion. A plurality of exposed mast terminals are located in proximity to the lower portion of the mast. An electrical joint is located in the mast for connecting the low voltage power source to the plurality of exposed mast terminals. The mast is dimensioned for enabling the operator to insert the lower portion of the mast into the recess defined in the socket for connecting the plurality of exposed mast terminals to the plurality of exposed socket terminals for connecting the low voltage power source to an electrical device.

In a more specific embodiment, the recess of the socket and the lower portion of the mast are keyed for permitting insertion of the mast into the recess defined in the socket in a unique orientation. The mast extends between the lower portion and the upper portion a distance greater than the palm of the operator for enabling an operator to grasp the mast between the fingers and the palm of the operator for inserting the mast into the recess in the socket. A lock may be provided for locking the mast within the recess of the socket. An enlarged handle may be secured to the mast dimensioned for grasping the handle between the fingers and the palm of an operator for enabling the operator to insert the lower portion of the mast into the recess of the socket.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 56 is an isometric view of the joystick assembly of FIGS. 54 and 55;

FIG. 57 is a top view of the joystick assembly of FIG. 56;

FIG. 58 is a rear view of the joystick assembly of FIG. 57;

FIG. 59 is a side view of the joystick assembly of FIG. 58;

FIG. 68 is a view of a thirteenth embodiment of a personal mobility vehicle incorporating the moveable hand control operated by a linear actuator;

FIG. 69 is a front view of FIG. 68;

FIG. 72 is a side view of a fifteenth embodiment with the universal electrical connector of FIGS. 70 and 71 located in a scooter type personal mobility vehicle;

FIG. 73 is a side view of a sixteenth embodiment with the universal electrical connector of FIGS. 70 and 71 charging a battery removed from the personal mobility vehicle;

FIG. 74 is a side view seventeenth embodiment with the universal electrical connector incorporating a DC to DC converter circuit for charging an electrical device;

FIG. 79 is an isometric cut away view of the interior of the universal electrical connector of FIGS. 77 and 78; and FIG. 80 is an enlarged isometric view the socket of FIG. 78.

Similar reference characters refer to similar parts throughout the several Figures of the drawings.

DETAILED DISCUSSION

Figure 2:
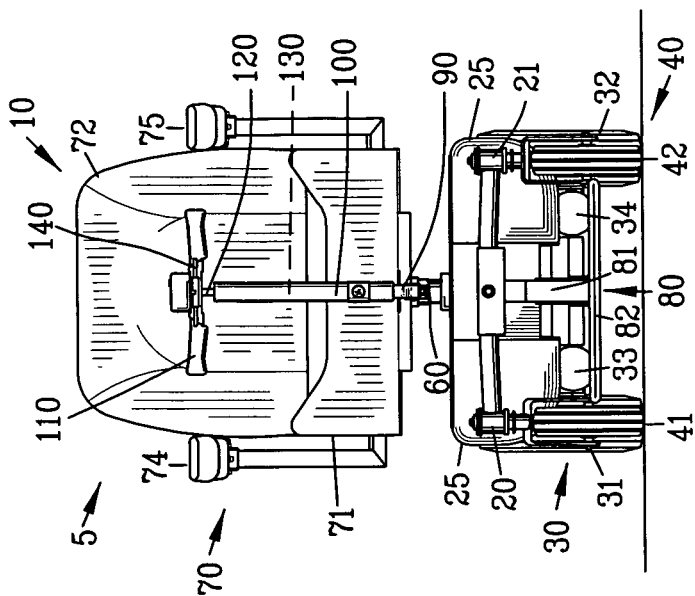
FIG. 2 is a front view of FIG. 1.

FIGS. 1-4 are various views of a dual motor vehicle 5 incorporating an improved steering and control assembly 10 of the present invention. In this embodiment, the dual motor vehicle 5 is shown as an electric power wheelchair (power chair) type personal mobility vehicle. However, it should be understood that the present invention may be applied to any type of dual motor vehicle with joystick controls such as a floor scrubber, platform lift and the like.

The personal mobility vehicle 5 comprises a frame 20 extending between a first frame end 21 and a second frame end 22. The first frame end 21 and the second frame end 22 define an intermediate frame portion 23 of the frame 20. The frame 20 of the personal mobility vehicle 5 is covered by a covering 25 for overlaying interior portions of the personal mobility vehicle 5 and for enhancing the attractiveness of the personal mobility vehicle 5.

Figure 4:
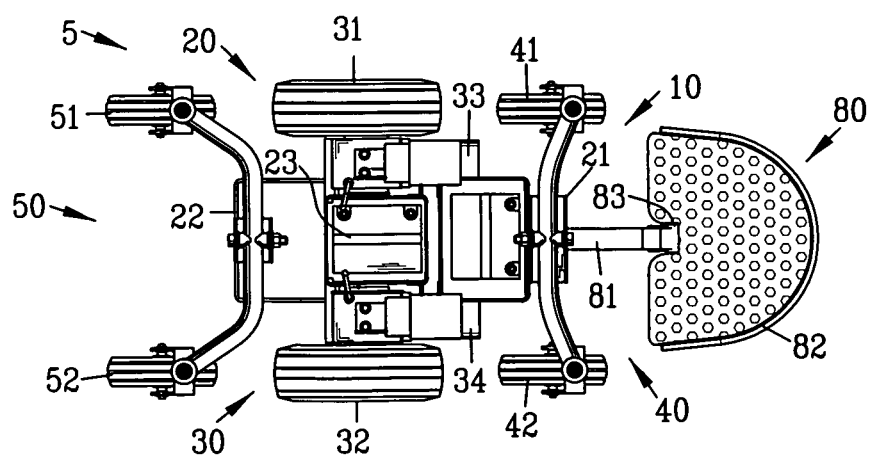
FIG. 4 is a bottom view of FIG. 1.

As best shown in FIG. 4, the personal mobility vehicle 5 comprises a drive wheel assembly 30 having a right and a left drive wheel 31 and 32 located in proximity to the intermediate frame portion 23 of the frame 20. A first and a second electric motor 33 and 34 drive the right and left drive wheels 31 and 32.

A front caster wheel assembly 40 is located in proximity to the first frame end 21 of the frame 20. The front caster wheel assembly 40 comprises a right and a left caster wheel 41 and 42. The right and left caster wheels 41 and 42 are shown as right and left caster wheels mounted by swivels to the first frame end 21 of the frame 20.

A rear caster wheel assembly 50 is located in proximity to the second frame end 22 of the frame 20. The rear caster wheel assembly 50 comprises a right and a left caster wheel 51 and 52. The right and left caster wheels 51 and 52 are shown as right and left caster wheels mounted by swivels to the second frame end 22 of the frame 20.

A pedestal 60 extends from the intermediate frame portion 23 of the frame 20 in a substantially vertical orientation. An upper end of the pedestal 60 extends upwardly for supporting a chair assembly 70.

The chair assembly 70 comprises a chair portion 71 and a backrest portion 72. In this example, the backrest portion 72 is pivotally mounted to the chair portion 71 by a pivot 73 for accommodating for the size and comfort of an occupant. The chair assembly 70 is rotatably mounted on the pedestal 60 with the rotation of the chair assembly 60 being controlled by a lever (not shown). The rotation of the chair assembly 70 facilitates the ingress and egress of an occupant from the personal mobility vehicle 5. Plural armrests 74 and 75 are secured to the chair portion 71 of the chair assembly 70. A rotational chair assembly 70 suitable for use with the present invention is more fully set forth in U.S. Pat. No. 6,361,111 which is incorporated by reference into the present application.

Figure 1:
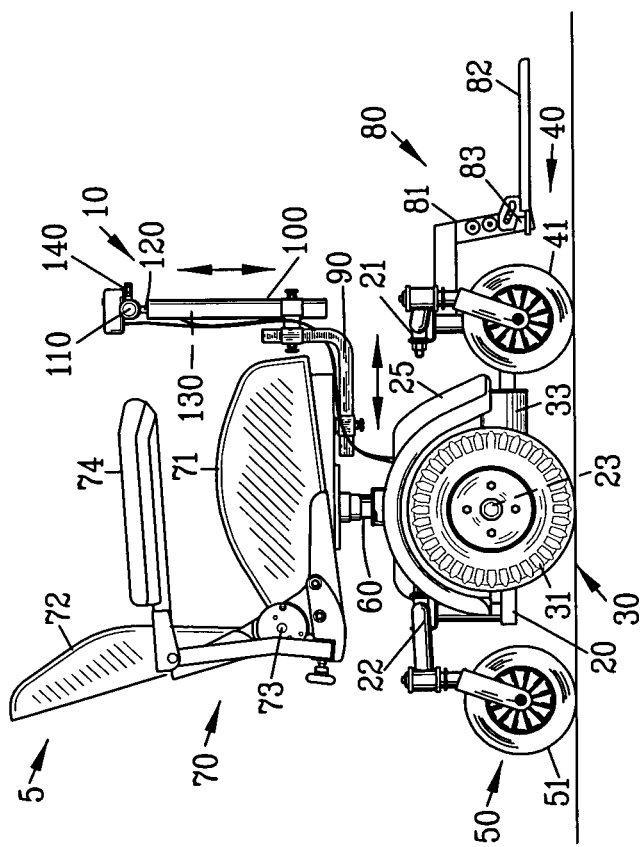
FIG. 1 is a side view of a personal mobility vehicle incorporating an electronic steering assembly with independent drive controls for a dual motor vehicle of the present invention for control by an occupant of the personal mobility vehicle.

A footrest assembly 80 is located on the first end 21 of the frame 20. The footrest assembly 80 comprises a footrest base 81 secured to the first end 21 of the frame 20. A footrest plate 82 mounted to the footrest base 81 by a pivot 83 enabling the footrest plate 82 to be pivoted between an operative position, wherein the first footrest plate 82 is disposed in a generally horizontal position as shown in FIG. 1 and an inoperative position wherein the footrest plate 82 is disposed in a generally vertical position (not shown). The footrest plate 82 provides a footrest for an occupant (not shown).

FIGS. 5-8 are enlarged views of the electronic steering assembly 10 shown in FIGS. 1-4. The electronic steering assembly 10 is secured to the personal mobility vehicle 5 for controlling the direction of the personal mobility vehicle 5. In this embodiment, the electronic steering assembly 10 comprises a base 90, a rotary coupling 100, a handlebar 110, a rotary sensor 120, and independent drive controls 140 with a separate sensor 143 for controlling speed, braking and forward/reverse. The independent drive control 140 is attached to the handlebar 110. The personal mobility vehicle 5 is steered by turning the handlebar 110 and driven by operating the independent drive control 140. The independent steering 110 and drive control 140 separate the functions of operation of the personal mobility vehicle making it easier to drive.

Figure 5:
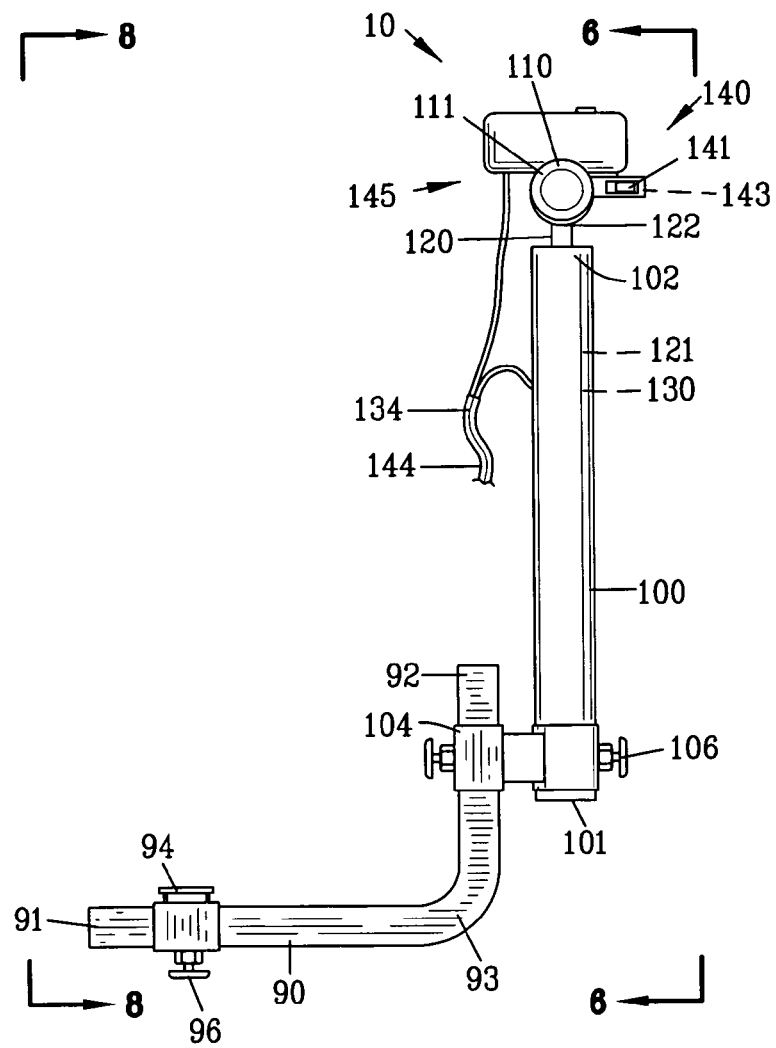
FIG. 5 is an enlarged view of a portion of FIG. 1 illustrating the electronic steering assembly.

FIG. 5 shows the base 90 extends between a first and a second end 91 and 92. A base mounting 94 secures the first end 91 of the base 90 to the personal mobility vehicle 5. In this example, a bend 93 is interposed between the first and second ends 91 and 92 of the base 90 with the base mounting 94 securing the first end 91 of the base 90 to the seat assembly 70 of the personal mobility vehicle 5. In the alternative, the base mounting 94 and the handlebar 110 may be adapted to mount the first end 91 of the base 90 to one of the armrests 74 and 75 of the personal mobility vehicle 5. In a further alternative, the base mounting 94 may be adapted to mount the first end 91 of the base 90 relative to the frame 20 of the personal mobility vehicle 5. In another alternative, the electronic steering assembly 10 and steering sensor 101 and drive controls 140 to operate speed, direction and the braking sensor 143 may be located on individual armrests 74 and 75 of the personal mobility vehicle 5.

Preferably, the base mounting 94 includes a base adjuster 96 for adjusting the position of the second end 92 of the base 90 relative to the personal mobility vehicle 5 as indicated by the arrows in FIG. 1. The base adjuster 96 may include a linear adjustment as indicated by the arrows as well as a rotational adjustment to provide a two dimensional adjustment in a horizontal plane (not shown).

A rotary coupling 100 extends between a lower end 101 and an upper end 102. A coupling mounting 104 secures the lower end 101 of the rotary coupling 100 to the second end 92 of the base 90. Preferably, the coupling mounting 104 includes a coupling adjuster 106 for adjusting the vertical position of the second end 102 of the coupling 100 relative to the personal mobility vehicle 5 as indicated by the arrows in FIG. 1.

The handlebar 110 comprises a right handlebar portion 111 and a left handlebar portion 112. A handlebar stem 120 extends between a lower stem end 121 and an upper stem end 122. The upper stem end 122 is secured to the handlebar 110 intermediated the right and left handlebar portions 111 and 112 with the right and left handlebar portions 111 and 112 extending outwardly therefrom.

The lower stem end 121 of the handlebar stem 120 extends into the upper end 102 of the rotary coupling 100 to be rotatably mounted within the rotary coupling 100. The rotary coupling 100 enables the right and left handlebar portions 111 and 112 to be rotated relative to the base 90 to steer and turn the dual motor vehicle.

Figure 10:
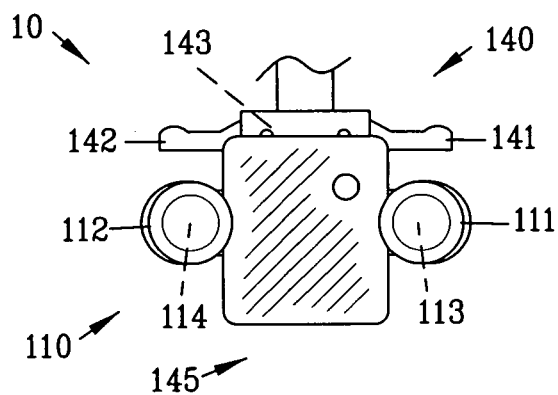
FIG. 10 is a top view of FIG. 9.
Figure 9:
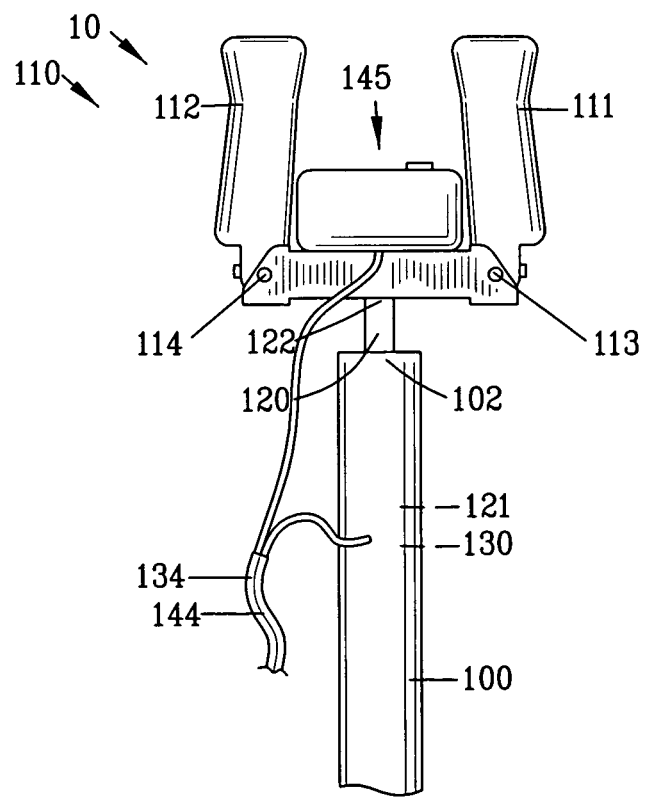
FIG. 9 is an enlarged view of a portion of FIG. 8 in a folded position.

FIGS. 9 and 10 illustrate the right handlebar portion 111 and the left handlebar portion 112 in a folded position. A right pivot 113 and a left pivot 114 mount the right handlebar portion 111 and the left handlebar portion 112 to the handlebar 110. The right handlebar portion 111 and the left handlebar portion 112 may be pivoted between an operating position shown in FIGS. 5 and 6 and a folded position shown in FIGS. 9 and 10. The folded position of the right and left handlebar portions 111 and 112 facilitate ingress and egress of an occupant (not shown) of the personal mobility vehicle 5 as well as requiring less space for transportation and storage.

Figure 11:
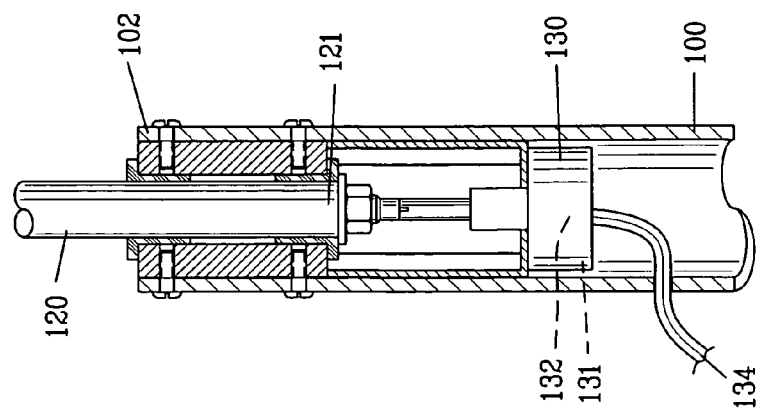
FIG. 11 is an enlarged sectional view along line 11-11 in FIG. 8.

FIG. 11 illustrate a handlebar position sensor 130 located internal to the rotary coupling 100 for sensing the rotational position of the handlebar 110 relative to the base 90 for the purpose of steering and turning the dual motor vehicle. The handlebar position sensor 130 comprises an electrical stator 131 and an electrical rotor 132 with the electrical rotor 132 being rotatable relative to the electrical stator 131. One of the electrical stator 131 and the electrical rotor 132 is fixed relative to the second end 91 of the base 90 with the other of the electrical stator 131 and the electrical rotor 132 being fixed relative to the lower stem end 121 of the handlebar stem 120. The handlebar position sensor 130 provides an electrical signal indicative of the rotational position of the handlebar 110 relative to the base 90. The handlebar position sensor 130 may comprise a potentiometer rotational sensor, a permanent magnetic rotational sensor, a variable inductance rotational sensor, a resolver rotational sensor, a magnetic rotational sensor, a capacitive rotational sensor or a Hall effect rotational sensor.

In this example, the handlebar position sensor 130 comprises a potentiometer stator 131P and a potentiometer rotor 132P with the potentiometer rotor 132P being rotatable relative to the potentiometer stator 131P for the purpose of steering and turning the dual motor vehicle. In this example, the potentiometer stator 131P is affixed relative to the base 90 and the potentiometer rotor 132P is affixed to the lower stem end 121 of the handlebar stem 120 for the purpose of steering and turning the dual motor vehicle.

Figure 7:
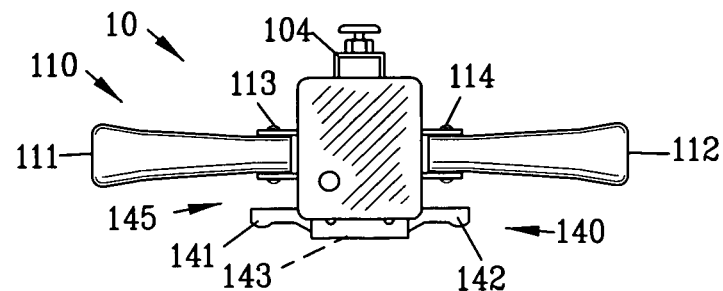
FIG. 7 is a top view of FIG. 6.
Figure 6:
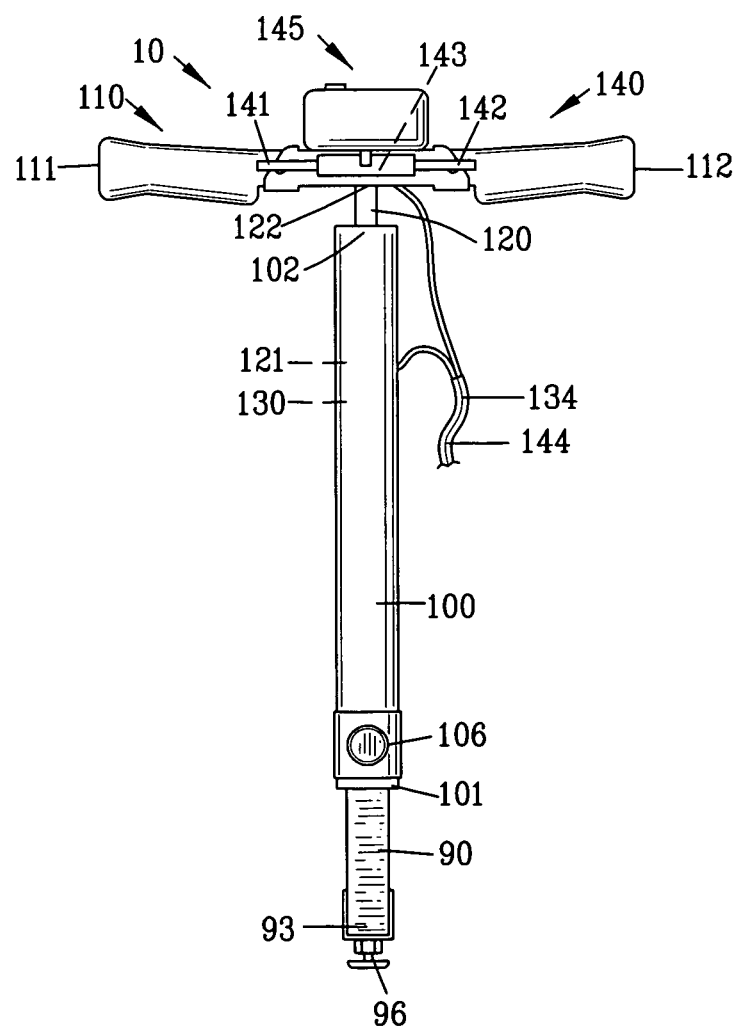
FIG. 6 is a view along line 6-6 in FIG. 5.
Figure 12:
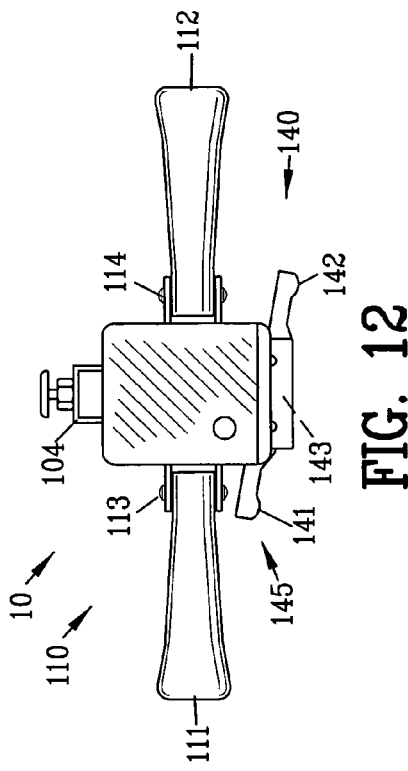
FIG. 12 is a view similar to FIG. 7 with a control lever depressed in first direction.
Figure 13:
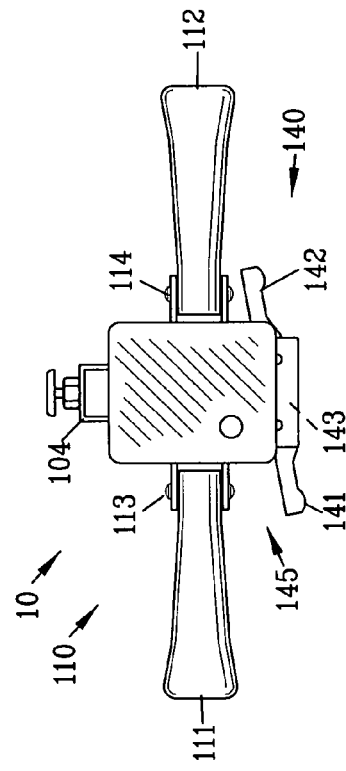
FIG. 13 is a view similar to FIG. 7 with a control lever depressed in second direction.

FIGS. 12 and 13 are enlarged view of FIG. 7 illustrating the operation of a speed, braking and forward-reverse control 140 located on the handlebar 110. The speed, braking and forward-reverse control 140 comprises a forward variable speed control lever 141 and a reverse variable speed control lever 142 which gradually accelerates the dual motor vehicle from zero to full speed when depressed completely. The variable forward/reverse control levers 141 and 142 operate a sensor 143 for providing an electrical output for controlling the variable forward speed, the variable reverse speed as well as a braking function of the first and second electric motors 33 and 34.

FIG. 12 illustrates the depression of the forward variable speed control lever 141 for controlling the variable forward speed of the first and second electric motors 33 and 34 when the control lever 141 is released a spring returns the forward variable speed control lever 141 to a center off position which returns the sensor 143 to a neutral position to signal the dual motor controller 150 to start the sequential engagement process of regenerative braking, dynamic braking and parking brakes.

FIG. 13 illustrates the depression of the reverse variable speed control lever 142 for controlling the variable reverse speed and the braking function of the first and second electric motors 33 and 34 when the control lever 142 is released a spring returns the reverse variable speed control lever 142 to a center off position which returns the sensor 143 to the neutral position to signal the dual motor controller 150 to start the sequential engagement process of regenerative braking, dynamic braking and parking brakes.

Figure 14:
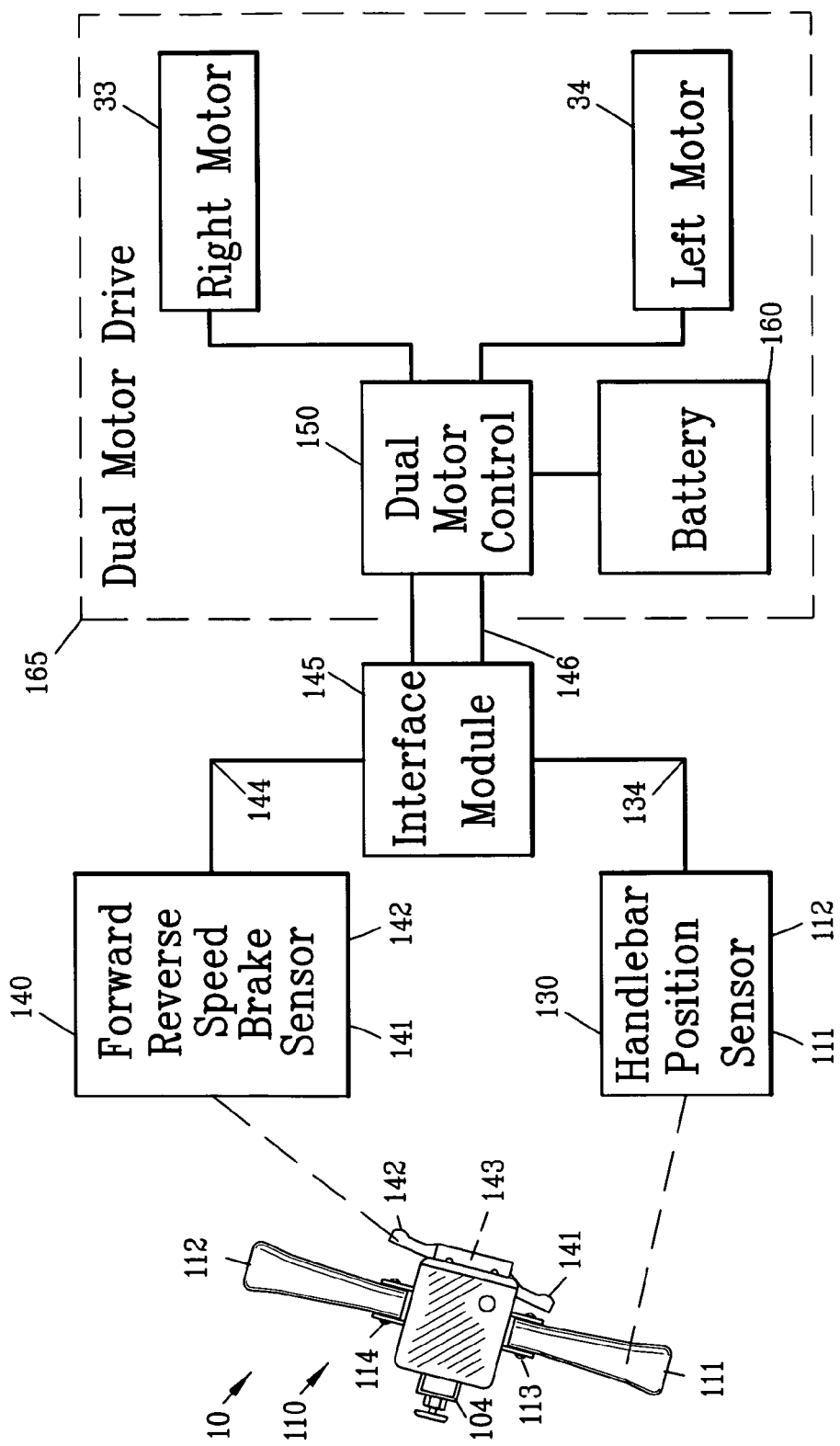
FIG. 14 is a block diagram illustrating the electrical components of the personal mobility vehicle of FIGS. 1-13.

FIG. 14 is a block diagram of the electrical components of the personal mobility vehicle 5 including an interface module 145, a dual motor controller 150 and a battery 160. The handlebar position sensor 130 and the speed, braking and forward/reverse control 140 comprising the forward and the reverse variable speed control levers 141 and 142, drive control sensor 143, and interface 145 are connected through the wires 134 and 144 and the electrical connector plug 146 to the dual motor controller 150. The dual motor controller 150 provides electrical power from the battery 160 to the first and second drive motors 33 and 34 in accordance with the outputs of the handlebar position sensor 130 the speed, braking and forward/reverse sensor 143, and interface module 145 to operate the dual motor vehicle. The present invention connects to the dual motor drive 165 through the interface module 145 and the dual motor controller 150.

The handlebar position sensor 130 is connected to the interface module 145 through the wires 134 and 144 and the dual electric motor controller 150 for controlling relative direction of the first and second drive motors 33 and 34 for steering the personal mobility vehicle 5 in accordance with the rotational position of the handlebar 110. The speed, braking and forward/reverse control 140 is connected to the interface module 145 and the dual motor controller 150 for controlling the variable forward speed, the variable reverse speed as well as a three stage sequential braking function of the first and second drive motors 33 and 34.

Figure 3:
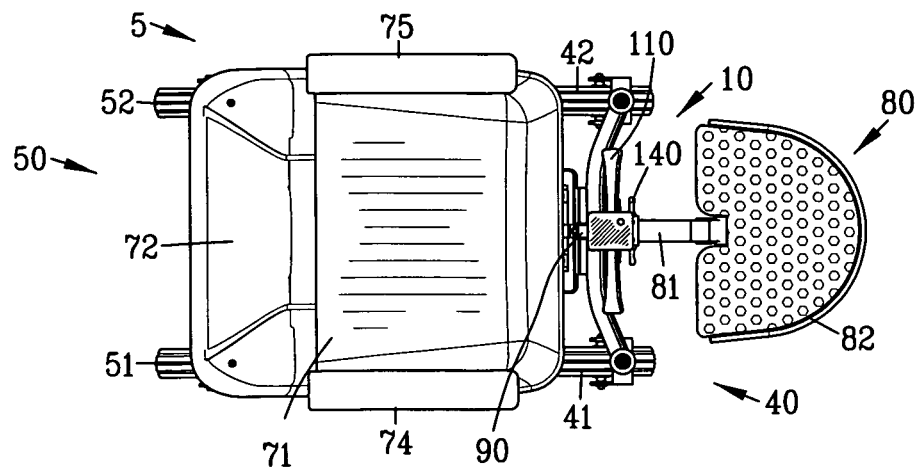
FIG. 3 is a top view of FIG. 1.
Figure 15:
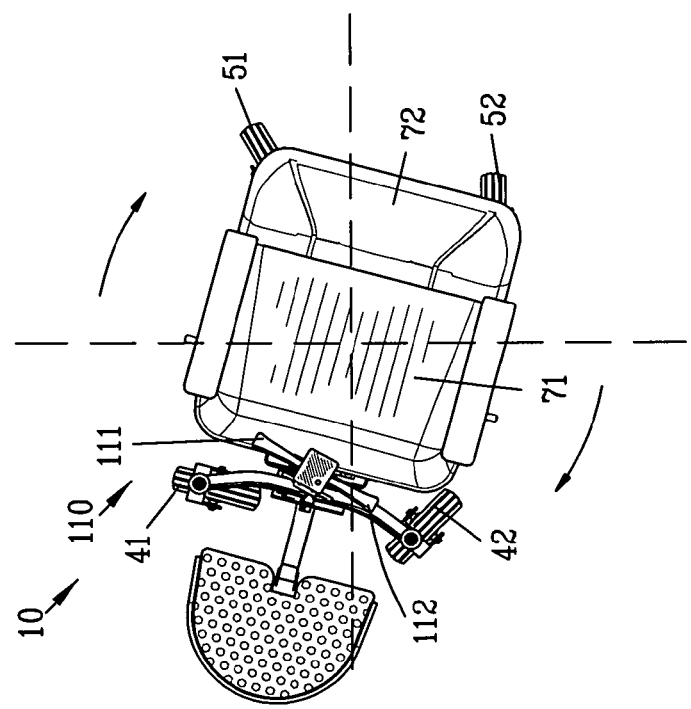
FIG. 15 is a top view similar to FIG. 3 illustrating a right rotation of the steering assembly for steering the personal mobility vehicle toward the right in FIG. 12.

FIG. 15 is a top view similar to FIG. 3 illustrating a right rotation of the electronic steering assembly with independent drive controls for a dual motor vehicle 10 for steering the personal mobility vehicle 5 toward the right in FIG. 12.

Figure 16:
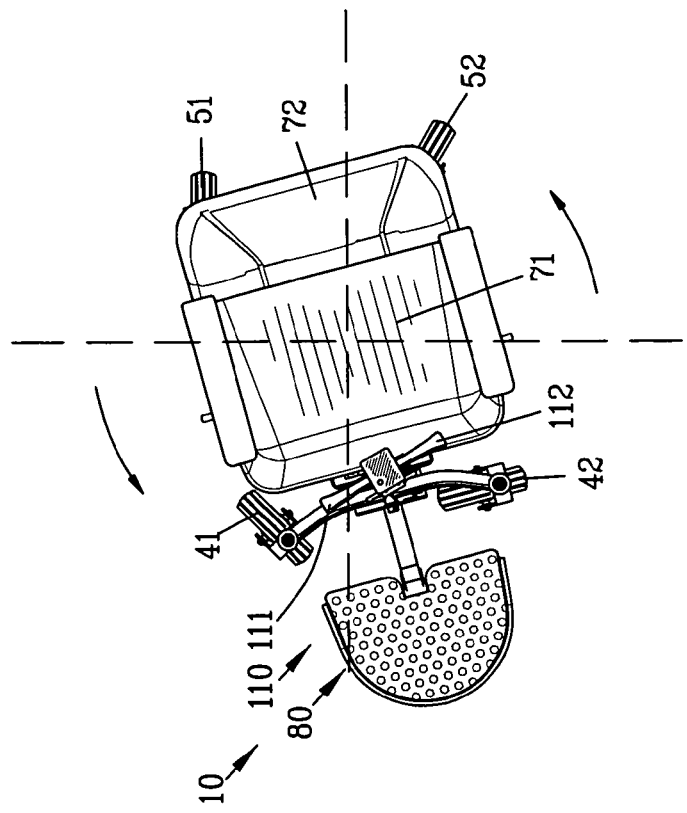
FIG. 16 is a is a top view similar to FIG. 12 illustrating a left rotation of the steering assembly for steering the personal mobility vehicle toward the left in FIG. 13.

FIG. 16 is a top view similar to FIG. 16 illustrating a left rotation of the electronic steering assembly with independent drive controls for a dual motor vehicle 10 for steering the personal mobility vehicle 5 toward the left in FIG. 13.

Figure 18:
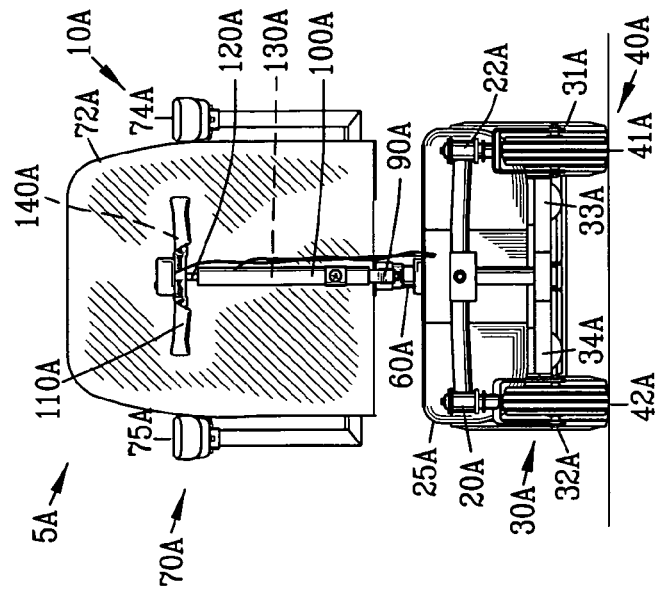
FIG. 18 is a rear view of FIG. 17.
Figure 17:
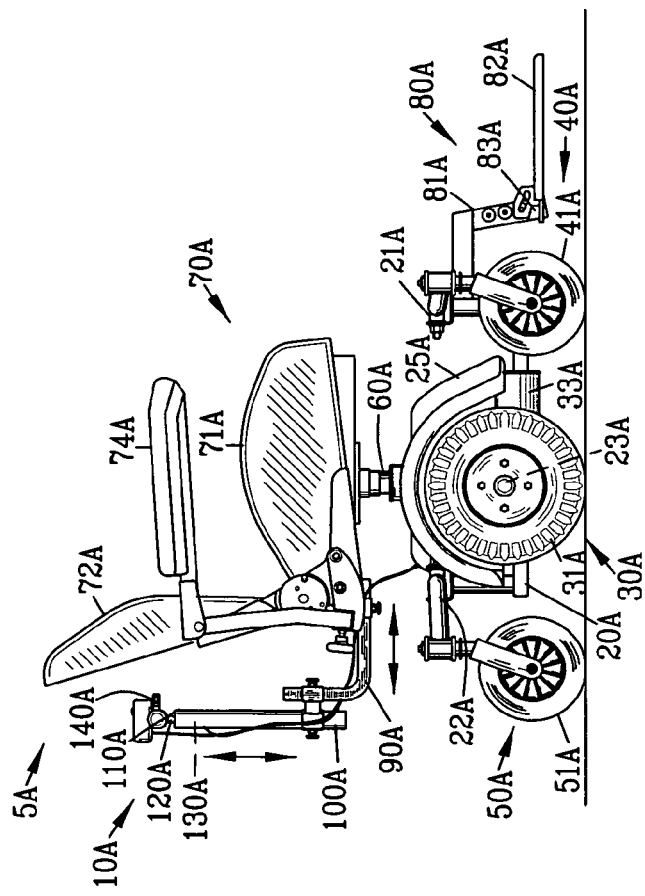
FIG. 17 is a side view of a second embodiment of the personal mobility vehicle incorporating the electronic steering assembly with independent drive controls for a dual motor vehicle for control by an attendant to the personal mobility vehicle.

FIGS. 17 and 18 depict a second embodiment of the present invention illustrating a personal mobility vehicle 5A incorporating the electronic steering assembly 10A for operation by an attendant (not shown). In this embodiment, the base 90A is adapted to be mounted behind a seat assembly 70A of the personal mobility vehicle 5A for enabling an attendant (not shown) to control the personal mobility vehicle 5A.

Figure 20:
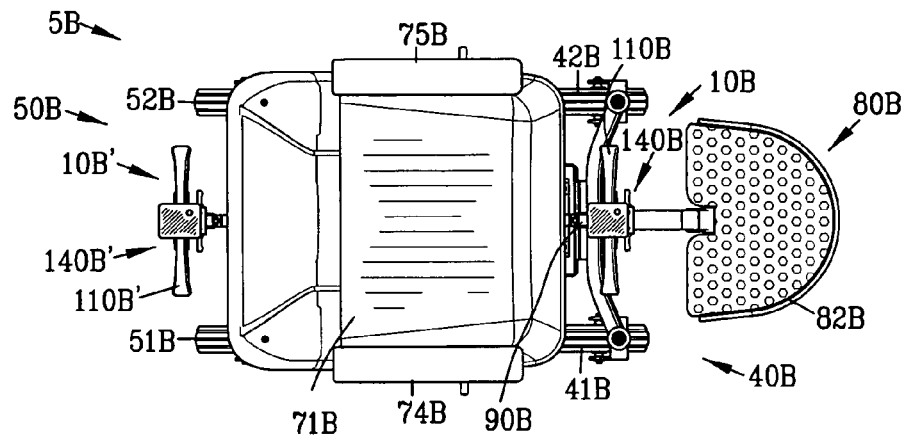
FIG. 20 is a top view of FIG. 19.
Figure 19:
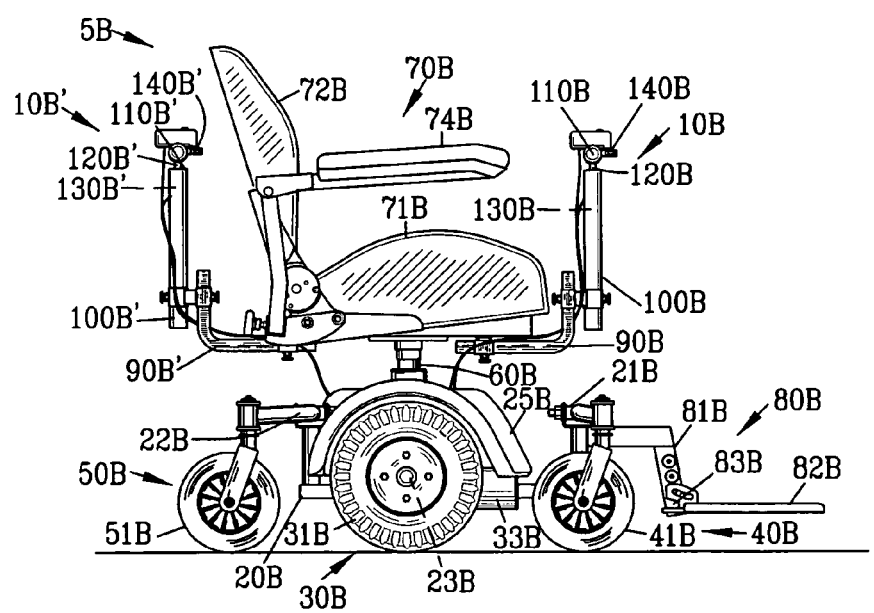
FIG. 19 is a side view of a third embodiment of a personal mobility vehicle incorporating plural electronic steering assemblies with independent drive controls for a dual motor vehicle for control by both an occupant or an attendant to the personal mobility vehicle.

FIGS. 19 and 20 depict a third embodiment of the present invention illustrating a personal mobility vehicle 5B incorporating the plural electronic steering assembly 10B and 10B' for control by both an occupant (not shown) or by an attendant (not shown) to the personal mobility vehicle 5B. The base 90B is adapted to be mounted to position the handlebar 100B in front of the seat assembly 70B of the personal mobility 5B vehicle for enabling an occupant (not shown) to control the personal mobility vehicle 5B. The base 90B' is adapted to be mounted to position the handlebar 100B' behind the seat assembly 70B of the personal mobility 5B vehicle for enabling an attendant (not shown) to control the personal mobility vehicle 5B.

Figure 22:
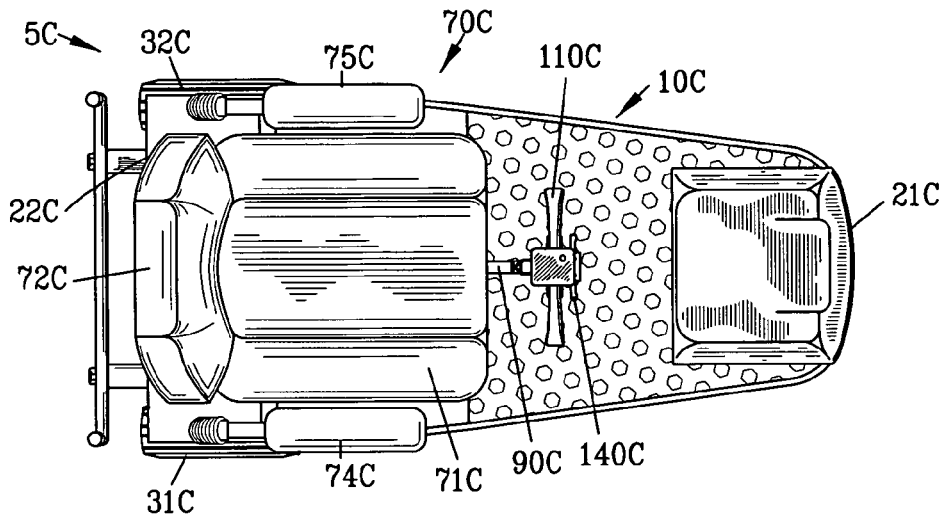
FIG. 22 is a top view of FIG. 21.
Figure 21:
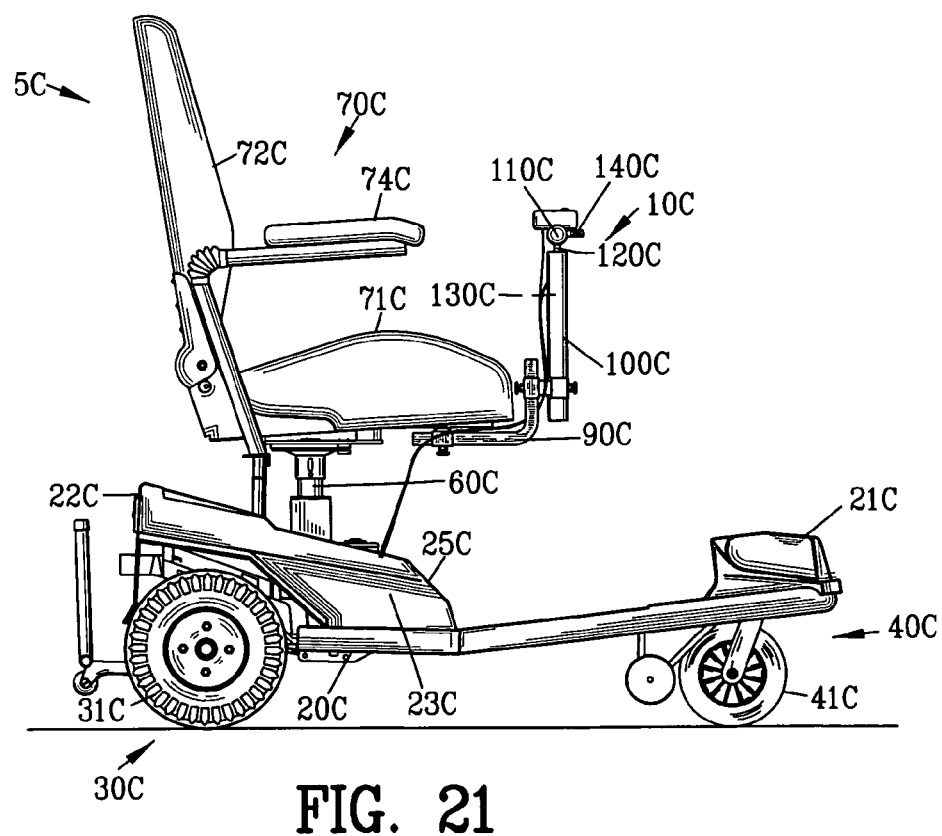
FIG. 21 is a side view of a fourth embodiment of a scooter type personal mobility vehicle incorporating the electronic steering assembly with independent drive controls for a dual motor vehicle of the present invention.

FIGS. 21 and 22 depict a fourth embodiment of the present invention illustrating a scooter type personal mobility vehicle 5C incorporating the electronic steering assembly with independent drive controls 10C of the present invention. The traditional pivoted front wheel mechanically controlled by a handlebar (not shown) has been replaced by a front caster wheel assembly 40C comprising a central caster wheel 41C. In should be appreciated by those skilled in the art that this fourth embodiment of the present invention may incorporate plural front caster wheels.

The base 90C is adapted to be mounted to position the handlebar 100C in front of the seat assembly 70C of the personal mobility 5C vehicle for enabling an occupant (not shown) to control the personal mobility vehicle 5C. It should be appreciated by those skilled in the art that a personal mobility vehicle may be fashioned to provide the attendant controlled personal mobility vehicle 5 as shown in FIGS. 1-11 as well as the occupant controlled personal mobility vehicle 5B as shown in FIGS. 12-19.

Many physically challenged persons prefer to use a scooter type personal mobility vehicle instead of a power chair in spite of seating problems as is well known to those skilled in the art. In many instances this decision is made based on the intuitive simplicity of the scooter control system. However, the upper body strength required for turning prohibits some patients from utilizing the scooter. In use, the improved steering and control assembly 10 of the present invention enables an operator to electronically steer and turn the dual motor vehicle 5 with minimal effort unlike a scooter type personal mobility vehicle of the prior art requiring upper body strength to mechanically steer a single or plural wheels.

Figure 8:
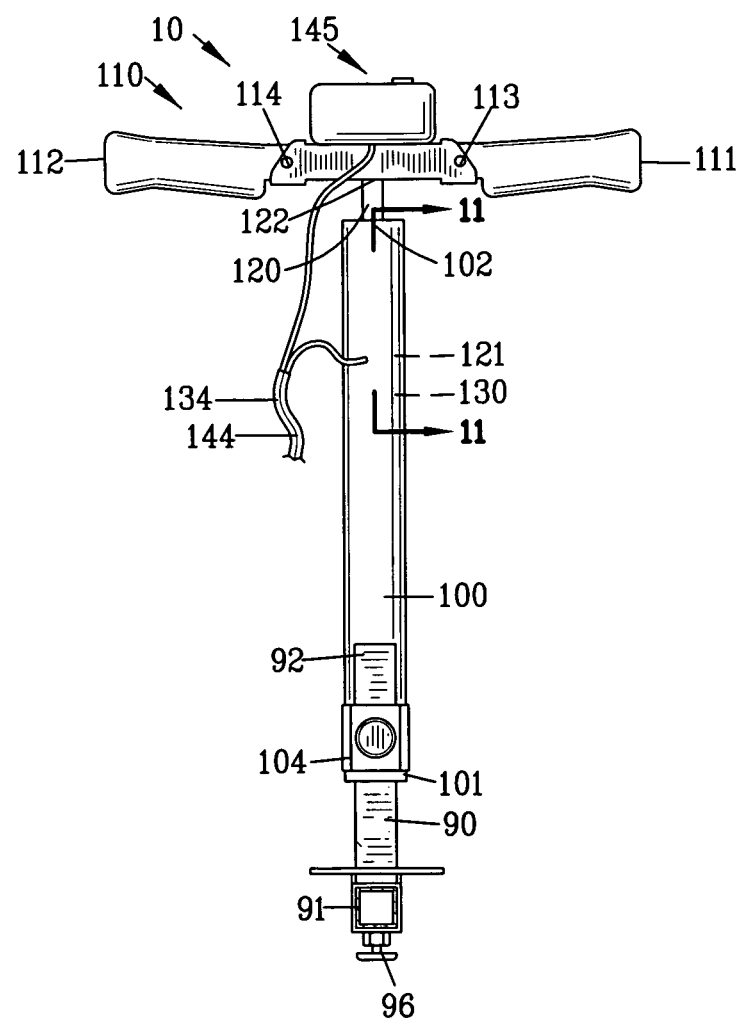
FIG. 8 is a view along line 8-8 in FIG. 5.

As the handlebar 110 is turned, the only resistance is the resistance between the inside handlebar tube 120 and the outside tube 102 as previously shown in FIG. 8. Since the inside tube is mounted on a bearing (not shown) within the outer tube 102, little to no force is required to steer and turn the dual motor vehicle 5.

Positioning the steering assembly 10 in the center of the vehicle enables the power chair user to achieve greater steering control and confidence with the steering controls in proximity to the rider within the line of sight of the occupant. Doorways, hallways and such narrow passageways are more easily navigated and can be aligned by the center position of the handlebar. The center-mounted steering assembly position is similar to a handlebar of a bicycle or the steering wheel of an automobile.

When a person first learns to walk, ride a bike, or drive a car, the human brain processes the sensory feedback for balance and coordination in the cerebellum (National Institute on Aging, "Inside the Human Brain: The Main Players", Nov. 25, 2008). In addition, according to the study, the cerebellum allows the person to move smoothly, maintain balance, and turn around without by reflex action. The cerebellum also involves with motor learning skills such as controlling a motor vehicle.

Unlike a joystick which controls up to seven different functions and is offset from the line-of-sight of the occupant of the power chair, the improved steering control assembly 10 of the present invention can be intuitively operated, similar to steering a motor vehicle or a bicycle. Typical joystick controls utilized a single control element for controlling both direction and velocity. Using a single input element to control left and right turns, forward and reverse direction and speed has been determined to be especially difficult for the neurologically impaired and the elderly. These combined functions present an obstacle to learning proper control of the power chair. Some functions such as operating in reverse are counterintuitive, resulting in travel in a direction opposite to the intended direction. A few potential users find the steep learning curve impossible to overcome.

The improved steering and control assembly 10 of the present invention solves these problems. It minimizes the need for the brain of a patient to re-learn the process of driving a vehicle. This is especially true of elderly patients, who may find learning new tasks especially difficult. Neurologically impaired patients are able to control the power chair due to the intuitive nature of the control system. To drive the dual motor vehicle, the handlebar is turned to the steer dual motor vehicle in the desired travel direction. On a mid-wheel drive power chair, turning is completed in place, enabling direction change without forward movement or inadvertent collision with an object.

The steering and control assembly is operable with a single or both hands. The right side or left side control levers for speed, braking and forward/reverse can also be operated with just one or two fingers from either side.

An additional benefit of the sturdy center handlebar structure is the safety it provides as a passive-restraint system and protection from accidental pedestrian contact. In busy pedestrian traffic, power chairs and wheelchairs are hard to see by pedestrians. Riders are concerned of personal injury to themselves or the pedestrian being hurt by falling onto the rider. The steering assembly increases rider comfort and security, since the handlebar can be grasped for support and provides added protection for the rider and others in crowds. The body postural positioning is symmetrical rather than the unbalanced position likely to be encountered by operation of armrest mounted joystick hand control.

The improved steering and control assembly 10 is less prone to accidental engagement or damage. The diaphragm of a joystick can be easily damaged and the joystick may be accidentally engaged when the joystick contacts or moves under a table or a desk. Operator injury such as broken fingers and hand injury often occurs when using a joystick and transiting confined spaces such as doorways and the like. The steering and control assembly is compact and portable, therefore it can be easily removed from the power chair to provide the user the comfort of traveling by airplane or motor vehicle while maintaining the security of the critical power chair controls.

The complexity of operating a joystick is substantially compounded for a walking attendant attempting to control the power chair when compared to a rider in a stationary seated position. The connector 146 allows the steering and control assembly 10 to be connected to multiple positions in front of the power chair or behind the power chair for an attendant. In crowds such as malls or sporting events many power chair users benefit from a caregiver or attendant to operate their vehicle, since the attendant will have a better view of oncoming pedestrians than the rider. The steering and control assembly 10 is less sensitive to slight inadvertent movements than the joystick and when installed behind the power chair rider for use by an attendant, overcomes the problems associated with attendant control of the power chair using a joystick.

Transferring a rider to or from a power chair may be more readily accomplished by simple removal of the steering and control handlebar system. Several operating and storage positions may be provided including in front, along either side or behind the seat. Retraction of the steering and control assembly 10 below the seat level and raising into the riding position may be accomplished with little effort. Alternatively, the steering and control assembly 10 can be mounted on a swivel off an armrest and be lowered and locked into place or may be small in size to be mounted at the end of an armrest.

To drive the dual motor vehicle after turning to the desired direction of travel, the forward speed control lever 141 is gradually depressed enabling forward movement. Increasing the amount of depression of the forward speed control lever 141 increases the speed of the power chair up to the pre-set maximum speed. Operation of the forward speed control 141 is intuitive and stops the vehicle automatically on release, whereby a spring returns the forward speed control 141 to a neutral position. Many new power chair users previously operated a similar scooter-type driving control, a bicycle, or an automobile thereby virtually eliminating the time required to learning to operate the power chair.

Since the human brain controls activities like thinking, planning, and problem solving, as well as attention and movement in the frontal lobe of the cerebral cortex (National Institute on Aging, "Inside the Human Brain: The Main Players", last update Nov. 25, 2008), the command functions for regulating speed, braking and forward/reverse controls take place in a part of the brain other than the cerebellum where steering commands are processed. This theory may explain why separating the functions of steering and turning from the functions of speed, braking and forward/reverse direction, as established in the present invention are more intuitive and easier to use than joystick controls.

To reverse direction of travel, the operator may choose to enable the reverse speed control lever 142 or turn the vehicle around in place by turning the handlebar. The drive controls also provide automatic three phase braking by releasing the speed control levers 141 or 142. A spring returns speed control levers 141 or 142 to center and begins stopping the vehicle as the interface module 145 signals the dual motor controller 150. Through the dual motor controller 150, the current to the motors is reversed, establishing regenerative braking which provides a smooth slow down and current flow into the batteries. Dynamic braking then occurs to completely stop the vehicle, followed by the application of the parking brakes on each motor 33 and 34. The parking brakes secure the vehicle even on inclines.

The steering and control assembly 10 includes a dashboard to house the interface command module 145, the sensor 143 for speed, braking and forward/reverse, as well as standard and optional switches and gauges for the additional operations of the dual motor vehicle.

Prior to steering or operating the dual motor vehicle 5, the operator is required to turn the vehicle on by depressing an on-off switch on the dashboard. Next, selection of the maximum speed for the present riding environment must be completed. The operator may select from various maximum speed ranges. Typically, indoor use requires a lower maximum speed settings while outdoor use permits higher maximum speeds. An LED indicator measures and monitors battery capacity in addition to providing fault monitoring via flash codes.

Optional controls for lights may be added to the power chair as desired. Other accessories such as elevating leg rests, seat lift actuators and other peripheral devices can be installed. Control of these accessories may be achieved through the dual motor controller 150 and switches on the dashboard or through the use of the speed control levers 141 and 142. The drive controls 140 may be separated from the steering assembly 10 and separately mounted at the end of an armrest, or in another position desired by the dual motor vehicle operator.

Figure 24:
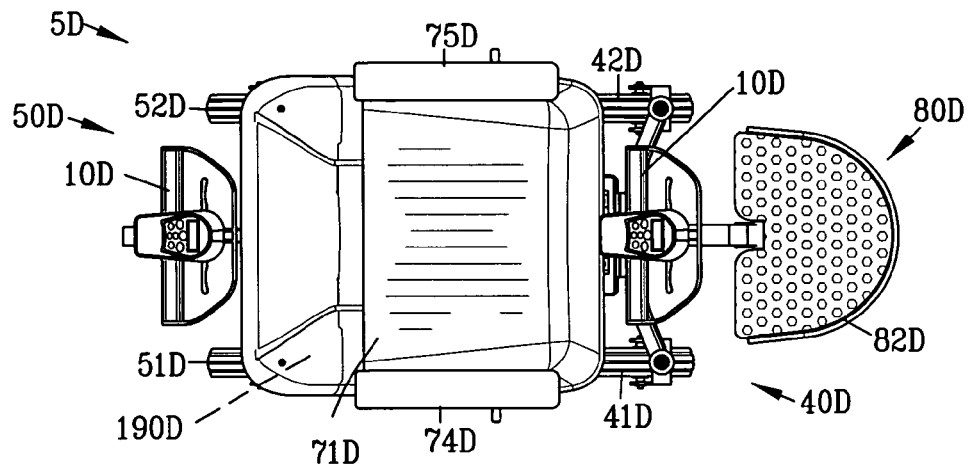
FIG. 24 is a top view of FIG. 23.
Figure 23:
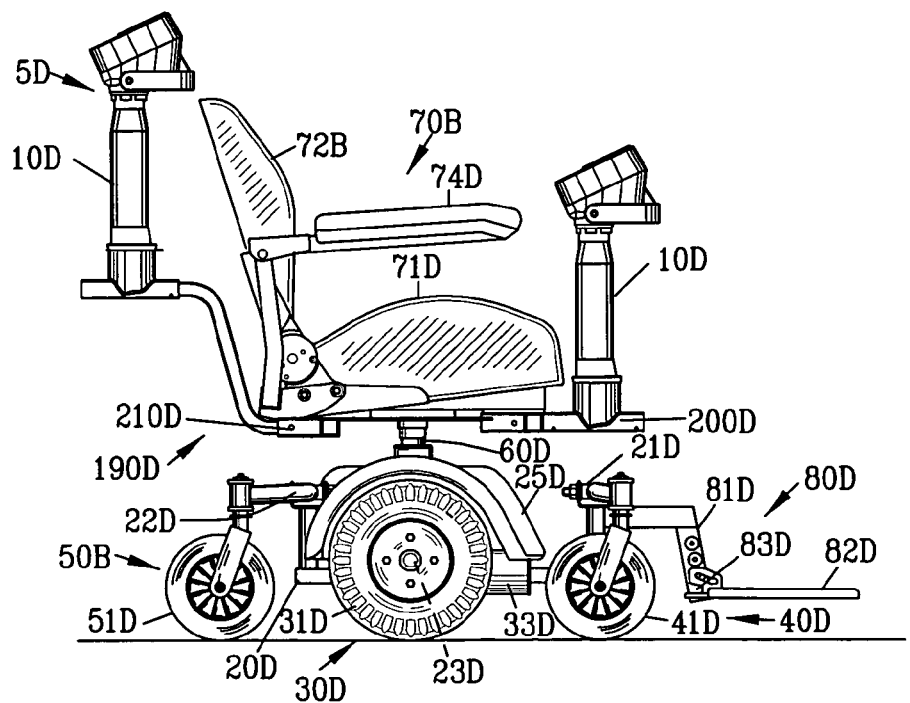
FIG. 23 is a side view of a fifth embodiment of a personal mobility vehicle incorporating the moveable hand control of the present invention for movement between multiple locations on the personal mobility vehicle.

FIGS. 23 and 24 are side and top views of a fifth embodiment of a personal mobility vehicle 5D incorporating the moveable hand control 10D of the present invention. The moveable hand control 10D comprises a base 190D for mounting to the dual motor vehicle 5D. In this embodiment, the mounting 190D is mounted to the underside of the chair portion 71D but it should be understood at the base 190D may be located other portions of the personal mobility vehicle 5D.

FIGS. 23 and 24 show two moveable hand controls 10D mounted on the dual motor vehicle 5D to illustrate to alternate positions for mounting the moveable hand control 10D, but it should be understood that only a single moveable hand control 10D is used at any one time.

The moveable hand control 10D may be mounted in front of the seat assembly 70D of the personal mobility vehicle 5D for enabling an occupant (not shown) to control the personal mobility vehicle 5D. In the alternative, moveable hand control 10D may be mounted behind the seat assembly 70D of the personal mobility 5D vehicle for enabling an attendant (not shown) to control the personal mobility vehicle 5D. As it will be described in greater detail here and after, the moveable hand control 10D may be mounted at other places on the vehicle 5D.

Figure 25:
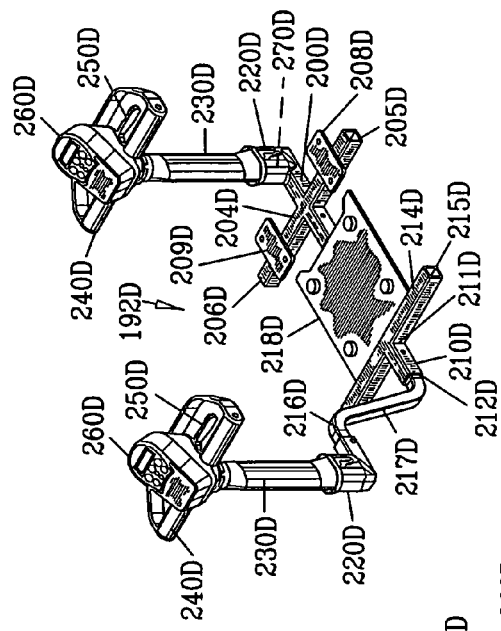
FIG. 25 is isometric view of the moveable hand control mounted to a first example of a base.
Figure 26:
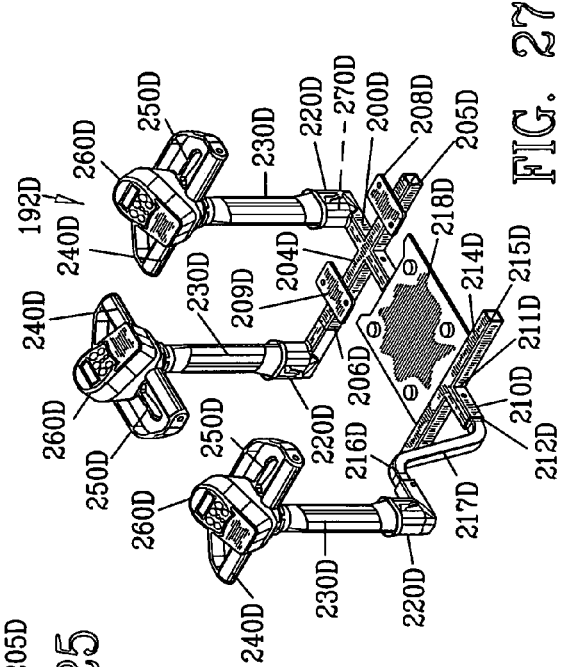
FIG. 26 is isometric view of the moveable hand control mounted in two positions on a second example of a base.
Figure 27:
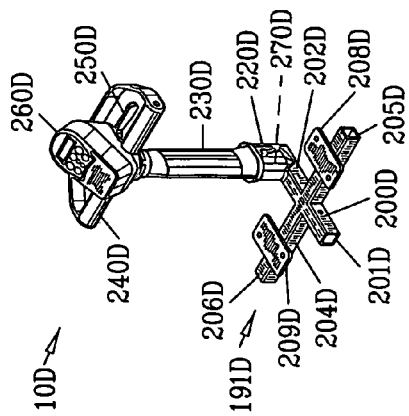
FIG. 27 is isometric view of the moveable hand control mounted in three positions on the base of FIG. 26.
Figure 28:
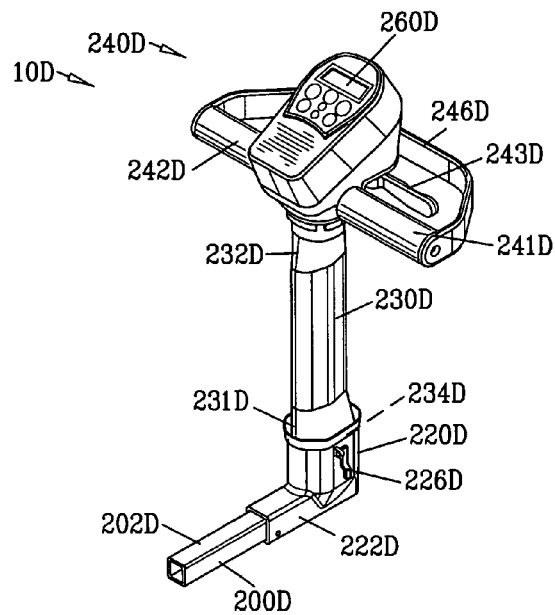
FIG. 28 is an isometric view of the moveable hand control.
Figure 29:
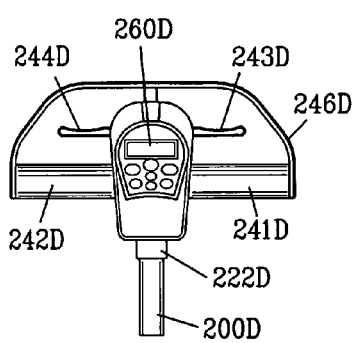
FIG. 29 is a top view of the moveable hand control.
Figure 30:
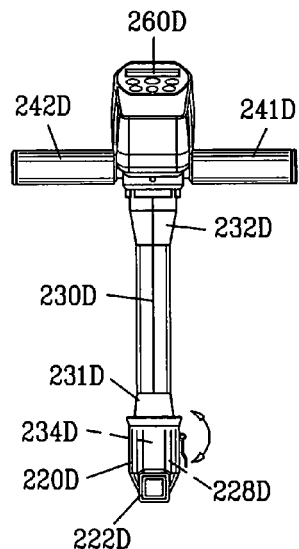
FIG. 30 is a rear view of the moveable hand control.
Figure 31:
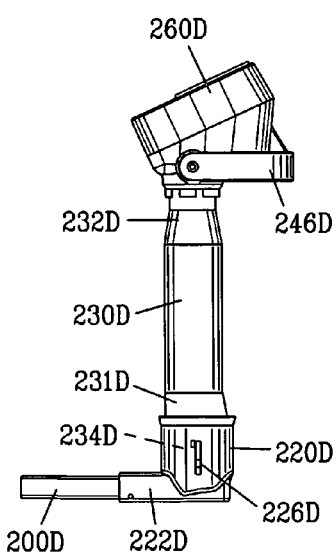
FIG. 31 is a side view of the moveable hand control.
Figure 32:
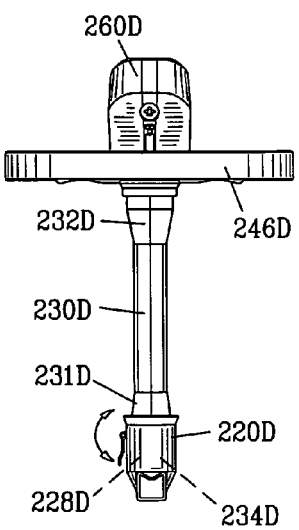
FIG. 32 is a front view of the moveable hand control.

FIGS. 25-27 illustrate various views of the moveable hand control 10D and the base separated from the dual motor vehicle 10D. The mounting 190D may take various forms with two different forms shown in FIGS. 25 and 26.

FIG. 25 is isometric view of the moveable hand control 10D mounted to a first example of a base 191D. The base 191D comprises a support member 200D is shown as a generally square tubing extending between a first end 201D and a second end 202D. A cross member 204D is secured to the support member 200D and extends between a first end 205D and a second end 206D. Plural mounting plates 208D and 209D are secured to the chair portion 71D of the vehicle 5D.

A socket 220D includes a socket connector 222D for engaging with the second end 202D of the support member 200D. A socket connector 222D is secured to the second end 202D of the support member 200D by conventional fastener. A socket 220D supports a rotary coupling 230D having a handlebar 240D, a forward-reverse speed control 250D and a control panel 260D. The interconnection between the socket 220D and the rotary coupling 230D will be described in greater detail hereinafter.

FIG. 26 is isometric view of the moveable hand control 10D mounted in two positions on a second example of a base 192D. The base 192D comprises a support member 210D is shown as a substantially square tubing extending between a first end 211D and a second end 212D. A cross member 214D is secured to the support member 210D and extends between a first end 215D and a second end 216D. Plural mounting plates 208D and 209D are secured to the chair portion 71D of the vehicle 5D. A first socket 220D is secured to the second end 202D of the support member 200D while a second socket is secured to the second end 212D of the support member 210D.

FIG. 27 is isometric view of the moveable hand control 10D mounted in three positions on the base 192D of FIG. 26. A socket 220D may be mounted on any one of the tubing ends including 202D, 205D, 206D, 212D, 215D and 216D. A rotary coupling 230D is receivable in any socket 220D located at tubing ends 202D, 205D, 206D, 212D, 215D and 216D.

FIGS. 28-32 are various views of the moveable hand control 10D. The socket 220D includes a locking latch 226D operating a locking pin 228D for securing the rotary coupling 230D to the socket 220D.

The rotary coupling 230D extends between a lower end 231D an upper end 232D. The lower end 231D defines a socket insert 234D having a key 235D. A. locking aperture 238D is defined in the socket insert 234D to cooperate with the locking pin 228D for securing the rotary coupling 230D to the socket 220D.

The upper end 232D of the rotary coupling 230D supports a handlebar 240D comprising a right handlebar portion 241D and a left handlebar portion 242D. The forward-reverse speed control 250D includes a forward speed control lever 243D and a reverse speed control lever 244D. The handlebar 240D and the forward-reverse speed control 250D operate in a manner as heretofore described.

Figure 33:
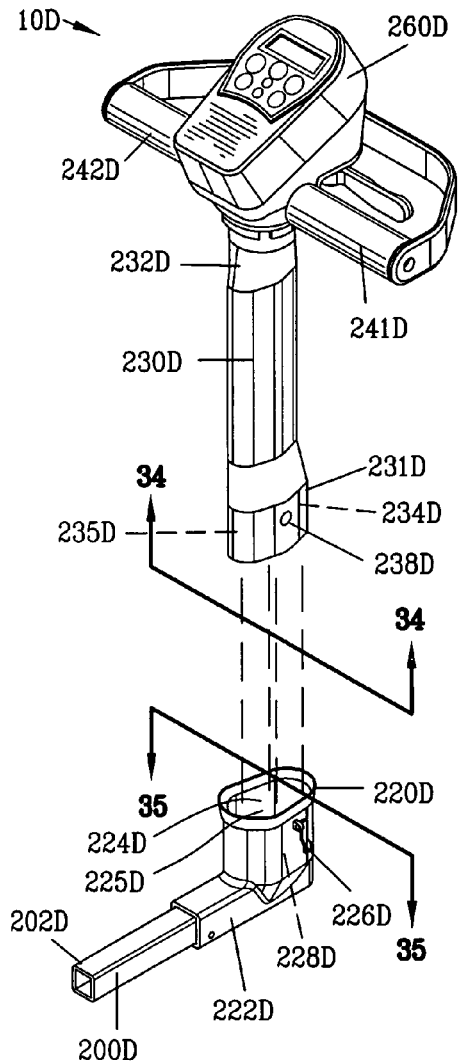
FIG. 33 is an enlarged exploded isometric view of the moveable hand control.
Figure 34:
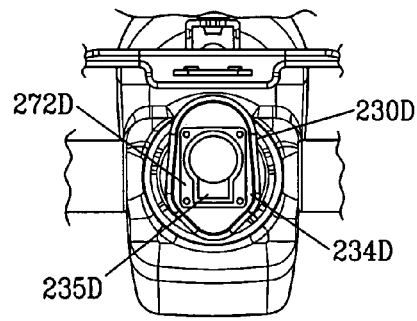
FIG. 34 is a view along line 34-34 in FIG. 33.
Figure 35:
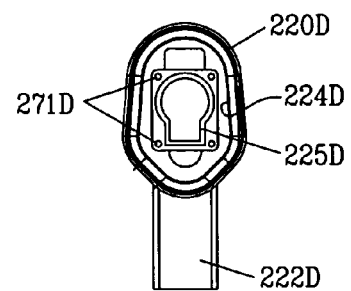
FIG. 35 is a view along line 35-35 in FIG. 33.

FIG. 33 is an enlarged exploded isometric view of the moveable hand control 10D with FIGS. 34 and 35 being sectional views thereof. Preferably, the insertion of the socket insert 234D into the socket 220D complete electrical connections 270D between the forward-reverse speed control 250D and the control panel 260D with the right drive motor 33 and the left drive motor 34.

In this example, the socket 220D is provided with multiple electrical connections 271D that engage with multiple electrical connections 272D mounted on the socket insert 234D. All of these sockets 220 the present on the vehicle 5D are prewired for enabling the simple insertion of the socket insert 234D into the socket 220D to complete a connection for properly operating the right drive motor 33 and the left drive motor 34.

Figure 37:
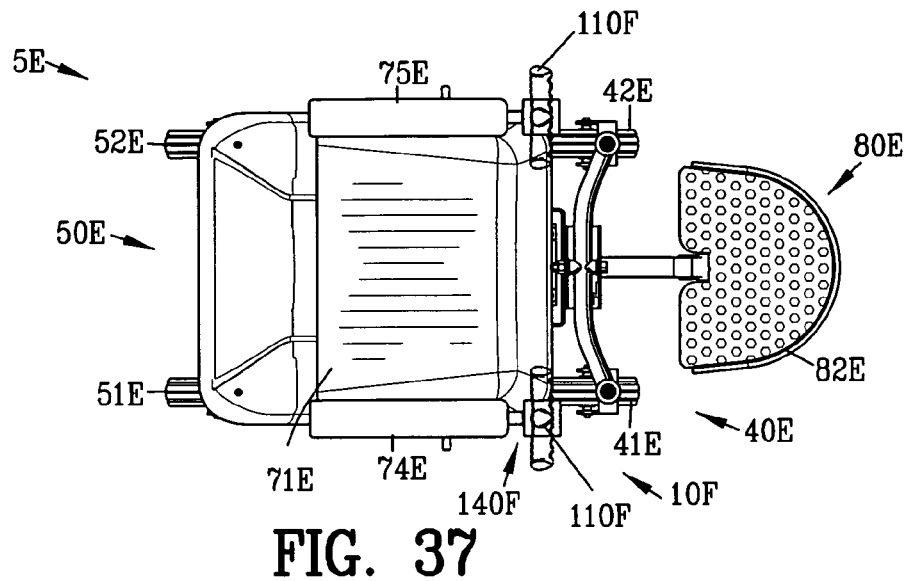
FIG. 37 is a top view of FIG. 36.
Figure 36:
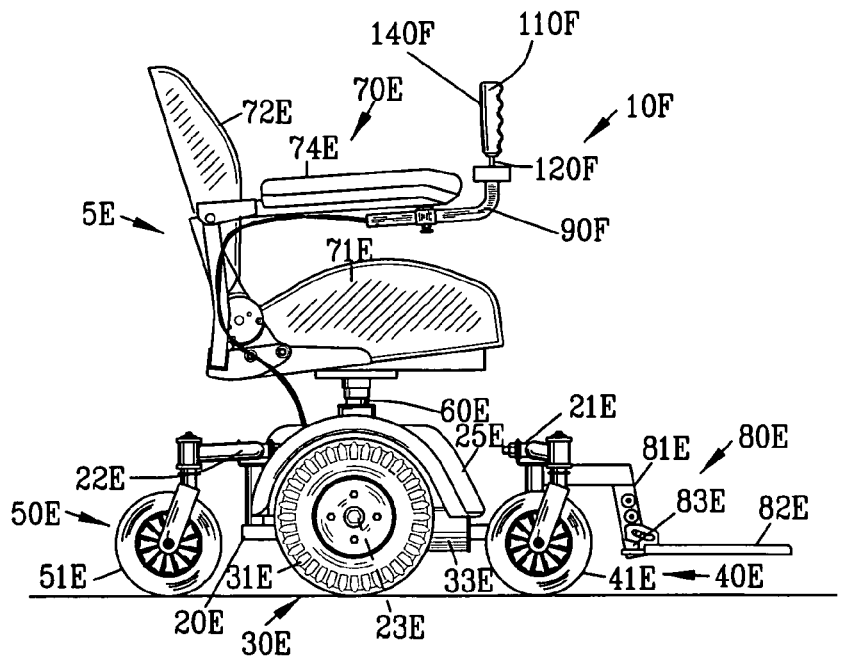
FIG. 36 is a side view of a sixth embodiment of a personal mobility vehicle incorporating the moveable hand control shown as a specialized control stick located on an armrest of the personal mobility vehicle.

FIGS. 36 and 37 are views of a seventh embodiment of a personal mobility vehicle 5E incorporating the moveable hand control 10E of the present invention. The moveable hand control 10E replaces a conventional joystick typically found on a power chair personal mobility vehicle of the prior art. The moveable hand control 10E is secured to the armrest 74E of the power chair personal mobility vehicle 5E.

In this embodiment, the movable hand control 10E is shown as a specialized steering bar 10E having a forward-reverse control 140E. The complete function of the specialized steering bar 10E will be explained in greater detail with reference to FIGS. 40 and 41.

Figure 39:
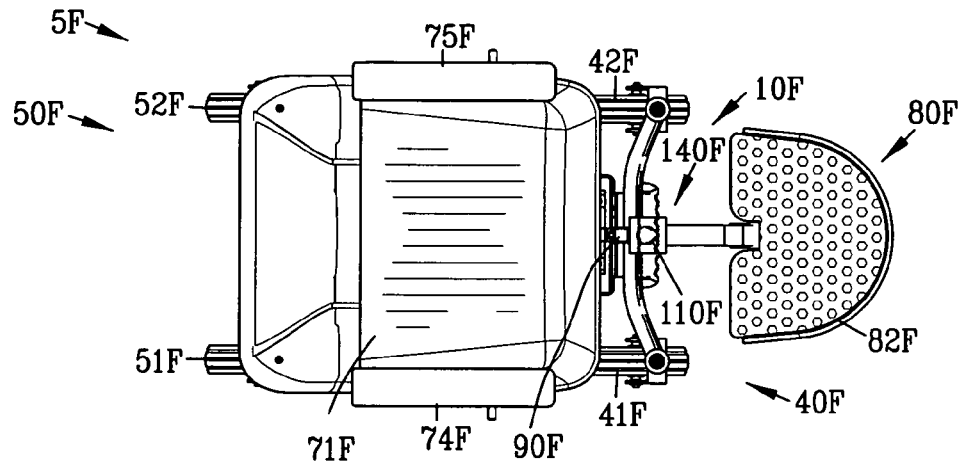
FIG. 39 is a top view of FIG. 38.
Figure 38:
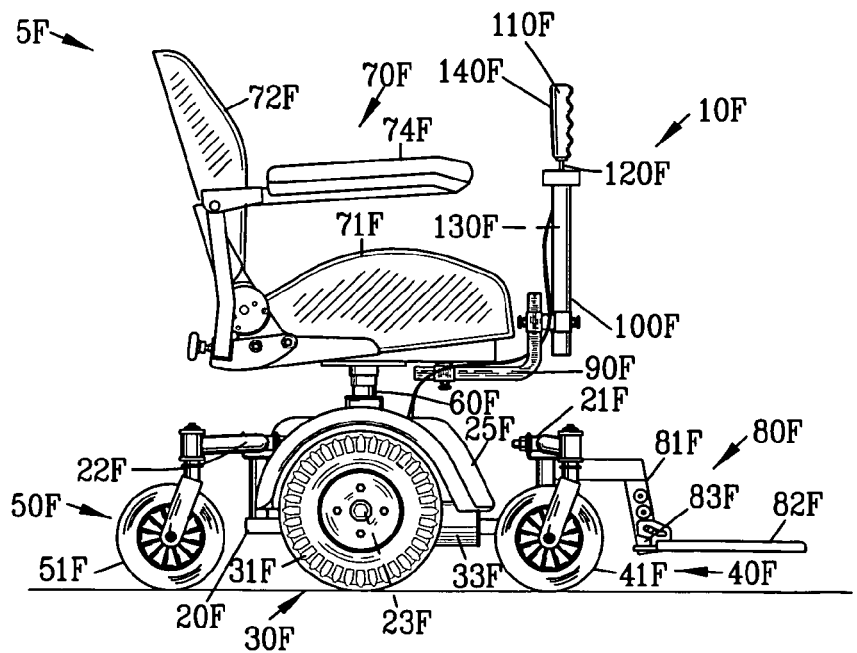
FIG. 38 is a side view of a seventh embodiment of a personal mobility vehicle incorporating the moveable hand control shown as a specialized steering bar located in a socket in front of the chair of the personal mobility vehicle.

FIGS. 38 and 39 are views of an eighth embodiment of a personal mobility vehicle 5F incorporating the moveable hand control 10F shown as a specialized steering bar 10F similar to the specialized steering bar 10E of FIGS. 36 and 37. The moveable hand control 10E is secured to the base 90F mounted to the chair assembly 70F of the power chair personal mobility vehicle 5F.

Figure 40:
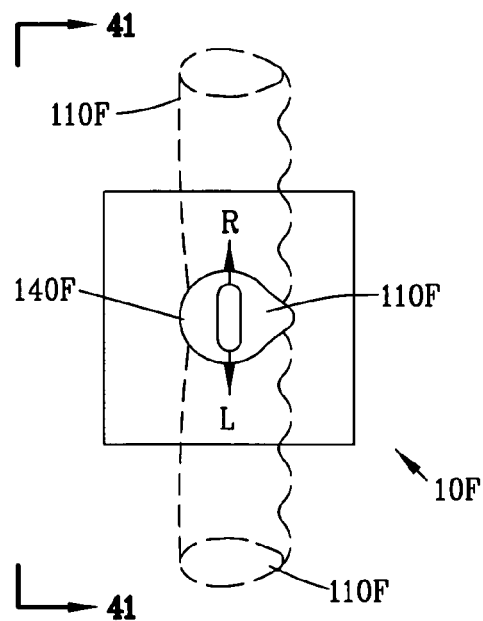
FIG. 40 is an enlarged top view of the specialized steering bar of FIG. 39.
Figure 41:
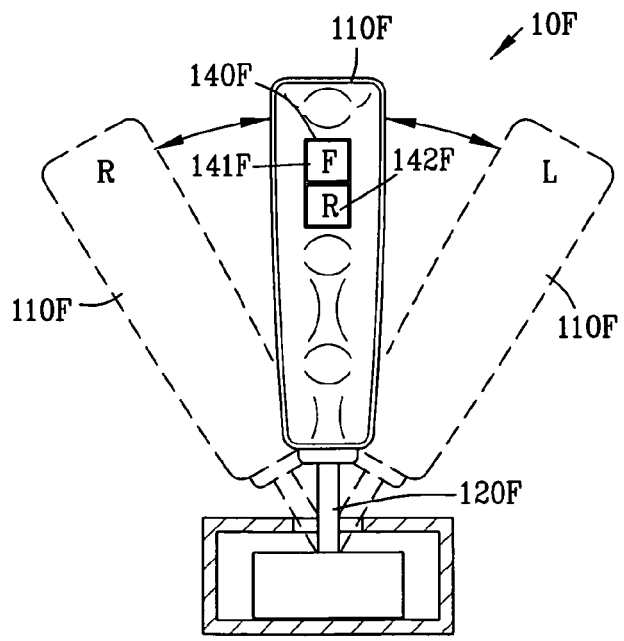
FIG. 41 is a view along line 41-41 in FIG. 40.

FIGS. 40 and 41 are enlarged view of the specialized steering bar 110F of FIGS. 36-39. The specialized steering bar 110F is restricted to movement only in a left and right direction as indicated by the arrows. The left and right movement of the specialized steering bar 110F controls the left and right turning of the personal mobility vehicles shown in FIGS. 36-39.

The forward-reverse control 140F is located on the specialized steering bar 110F. The forward-reverse control 140F comprises a forward speed control button 141F and a reverse-speed control button 142F. The buttons 141F and 142F are pressure sensitive buttons whereby an increased pressure on the respective button results in an increase speed of the personal mobility vehicle.

The specialized steering bar 110F simplifies the operation of the personal mobility vehicle by separating the left and right steering function 110F from the forward-reverse and speed function 140F. The separation of the steering function 110F from the forward-reverse and speed function 140F provides an more intuitive operation than an convention joystick.

Figure 43:
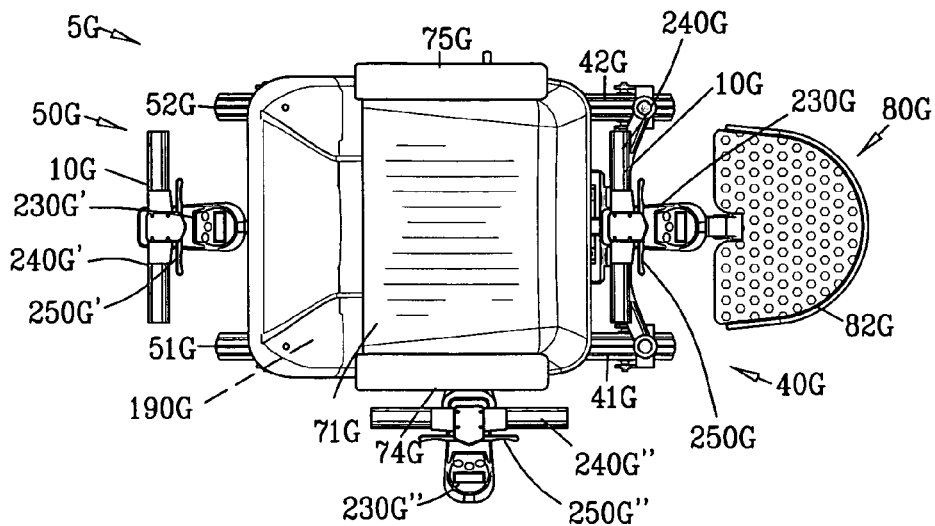
FIG. 43 is a top view of FIG. 42.
Figure 42:
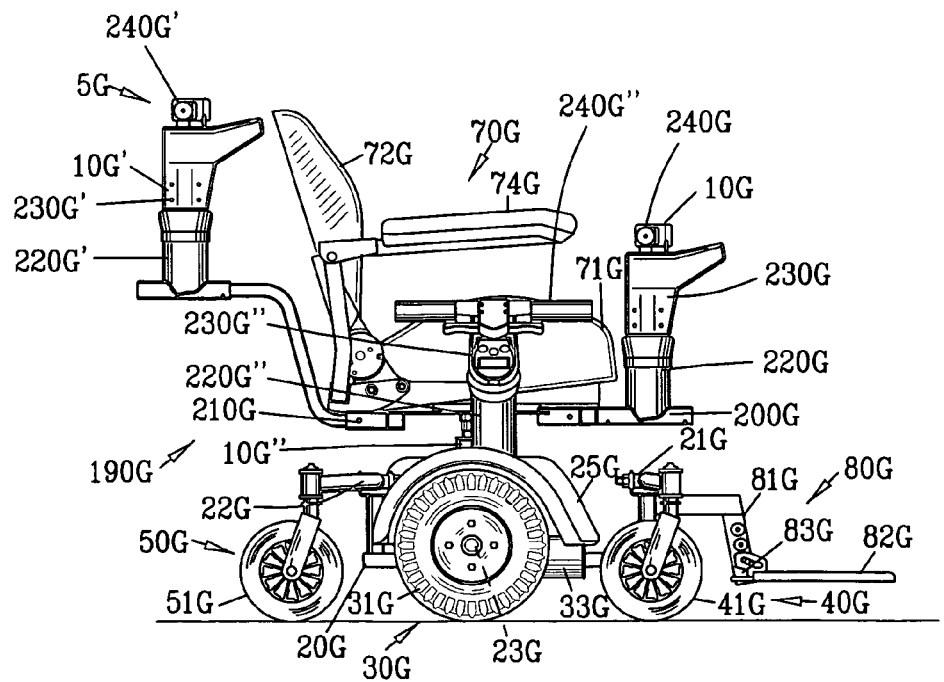
FIG. 42 is a side view of an eighth embodiment of a personal mobility vehicle incorporating the moveable hand control shown as a handlebar located at multiple locations on the personal mobility vehicle.

FIGS. 42 and 43 are side and top views of an eighth embodiment of a personal mobility vehicle 5G incorporating an improved moveable hand control shown as a handlebar 10G located at multiple locations on the personal mobility vehicle 5G. The moveable hand control 10G comprises a base 190G for mounting to the dual motor vehicle 10G. In this embodiment, the mounting 190G includes supports 200G and 210G mounted to the underside of the chair portion 71G.

Each of the moveable hand control 10G comprises a socket 220G for receiving a rotary coupling 230G supporting a handlebar 240G. As will be described in greater detail hereinafter, the rotary coupling 230G and the handlebar 240G may be quickly inserted and removed from the socket 220G. The quick insertion and removal of the rotary coupling 230G supporting a handlebar 240G allows for the rapid changing of the position of the rotary coupling 230G supporting a handlebar 240G as well as facilitating ingress and egress of the operator on the personal mobility vehicle 5G.

FIGS. 42 and 43 show three moveable hand controls 10G, 10G' and 10G" mounted on the dual motor vehicle 5G to illustrate to alternate positions for mounting the moveable hand control 10G, but it should be understood that only a single moveable hand control 10G is used at any one time. The moveable hand control 10G may be mounted in front of the seat assembly 70G of the personal mobility vehicle 5G for enabling an occupant (not shown) to control the personal mobility vehicle 5G. In the alternative, moveable hand control 10G' may be mounted behind the seat assembly 70G of the personal mobility 5G vehicle for enabling an attendant (not shown) to control the personal mobility vehicle 5G. The moveable hand control 10G" is positioned on the side and at a lower level on the personal mobility 5G vehicle for enabling and an occupant to move the personal mobility vehicle 5G close to a desk, table or the like without having the moveable hand control 10G" inhibit the legs of the occupant from being positioned under the desk, table or the like.

Figure 45:
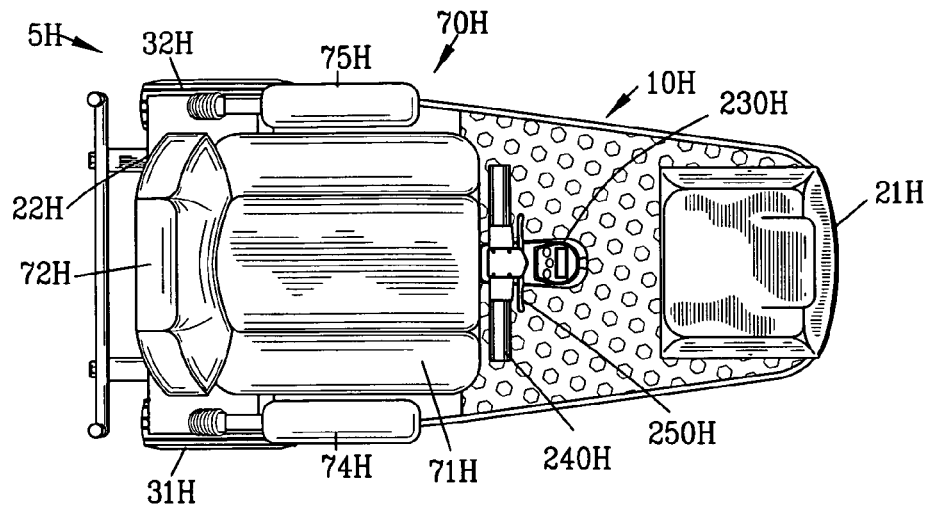
FIG. 45 is a top view of FIG. 44.
Figure 44:
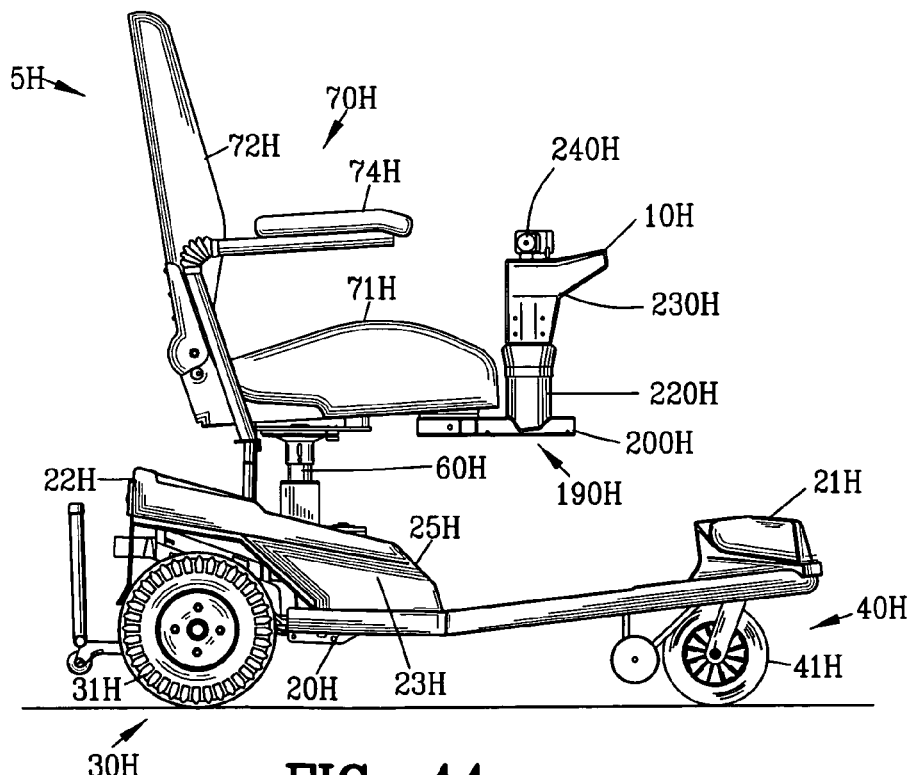
FIG. 44 is a side view of a ninth embodiment of a personal mobility vehicle incorporating the moveable hand control shown in FIGS. 42 and 43.

FIGS. 44 and 45 depict a ninth embodiment of the present invention illustrating a scooter type personal mobility vehicle 5H incorporating the moveable hand control 10H. The traditional pivoted front wheel has been replaced by a front caster wheel assembly 40H. The base 190H is adapted to be mounted to position the handlebar 100H in front of the seat assembly 70H of the personal mobility 5H vehicle for enabling an occupant (not shown) to control the personal mobility vehicle 5H.

The moveable hand control 10H comprises a socket 220H for removably receiving a rotary coupling 230H supporting a handlebar 240H for enabling the quick insertion and removal of the rotary coupling 230H supporting a handlebar 240H from the socket 220H to facilitate ingress and egress of the operator on the personal mobility vehicle 5H.

Figure 47:
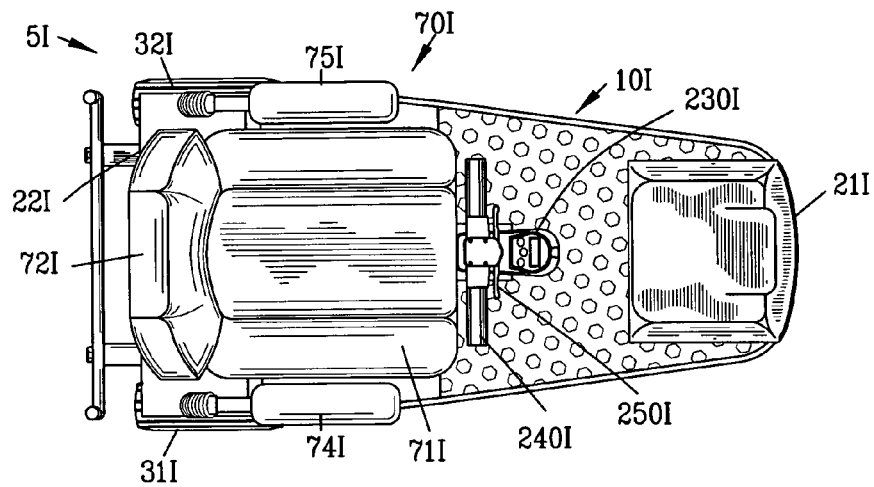
FIG. 47 is a top view of FIG. 46.
Figure 46:
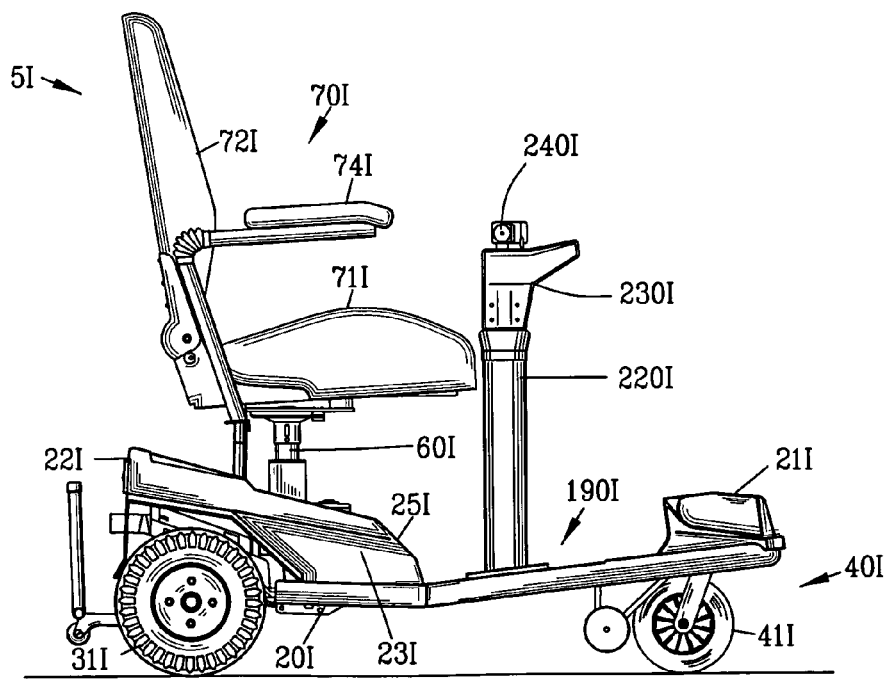
FIG. 46 is a side view of a tenth embodiment of a personal mobility vehicle incorporating the moveable hand control of FIGS. 44 and 45.
Figure 48:
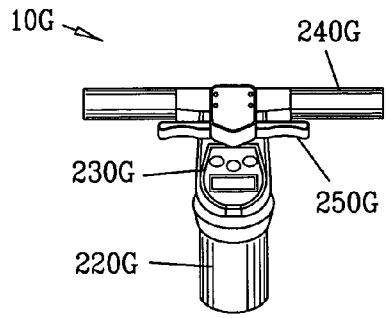
FIG. 48 is an isometric partial top view of the moveable hand control of FIGS. 42-47.
Figure 49:
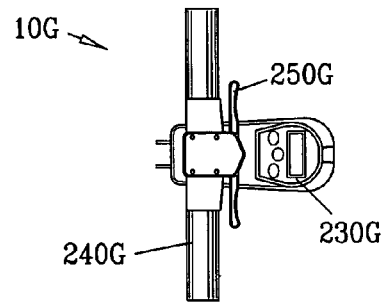
FIG. 49 is a top view of FIG. 48.

FIGS. 46 and 47 depict a tenth embodiment of the present invention illustrating a scooter type personal mobility vehicle 5I incorporating the moveable hand control 10I. In the example, the socket 220I is located on a pedestal 190I secured to the frame 201 scooter type personal mobility vehicle 5I.

FIGS. 48-53 are various views of the moveable hand control 10G of FIGS. 42-43. The rotary coupling 230G extends between a lower end an upper end with the lower end defining a socket insert 234G having a key 235G.

The upper end of the rotary coupling 230G supports a handlebar 240G comprising a handlebar 240G. The forward-reverse speed control 250G includes a forward-reverse speed control lever 250G. The handlebar 240G and the forward-reverse speed control 250G operate in a manner as heretofore described.

Figure 50:
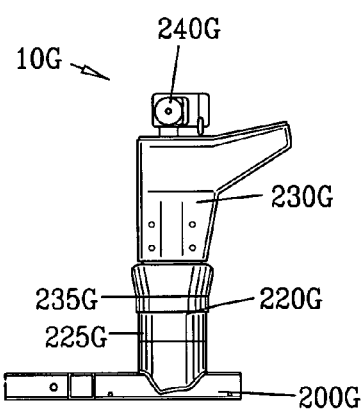
FIG. 50 is a side view of the moveable hand control of FIGS. 48 and 49 inserted into a socket.
Figure 51:
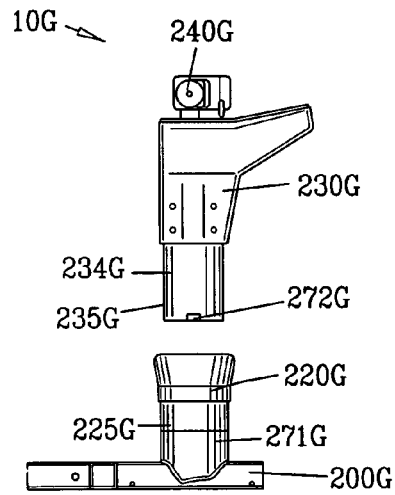
FIG. 51 is a view similar to FIG. 50 with the moveable hand control removed from the socket.

FIG. 50 illustrates the moveable hand control 10G inserted into the socket 220G whereas FIG. 51 illustrates the moveable hand control 10G removed from the socket 220G. As previously set forth, the socket 220G has a keyway 225G to receive the key 235G of the socket inset 234G. The socket 220G is provided with multiple electrical connections 271G that engage with multiple electrical connections 272G mounted on the socket insert 234G. The insertion of the socket insert 234G into the socket 220G complete electrical connections 270G between the forward-reverse speed control 250G and the control panel 260G with the right drive motor 33 and the left drive motor 34.

Figure 52:
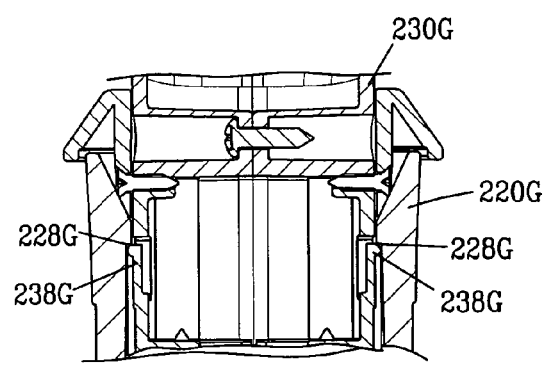
FIG. 52 is an enlarged sectional view of a portion of FIG. 50.
Figure 53:
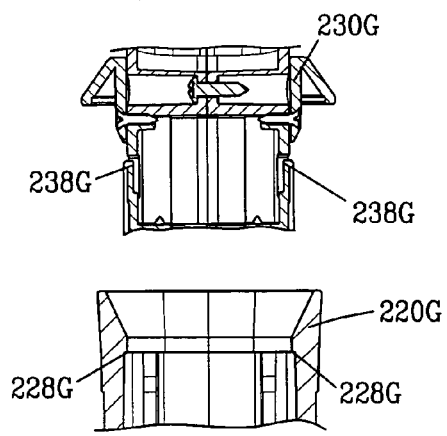
FIG. 53 is an enlarged sectional view of a portion of FIG. 51.

FIGS. 52 and 53 are enlarged sectional view of a portion of FIGS. 50 and 51. The socket 220G includes a resistance latch for temporarily securing the rotary coupling 230G to the socket 220G. The resistance latch includes a shoulder 228G defined in the socket 220G and a resilient arm 238G extending from the socket insert 234G. The insertion of the socket insert 234G into the socket 220G initially depresses the resilient arm 238G inwardly to pass by the shoulder 228G defined in the socket 220G. Thereafter, the resilient arm 238G resiliently expands to engage with the shoulder 228G in the socket 220G. The moveable hand control 10G can be removed from the socket 220G upon a moderate withdrawing force for facilitating insertion and removal of the moveable hand control 10G.

Figure 55:
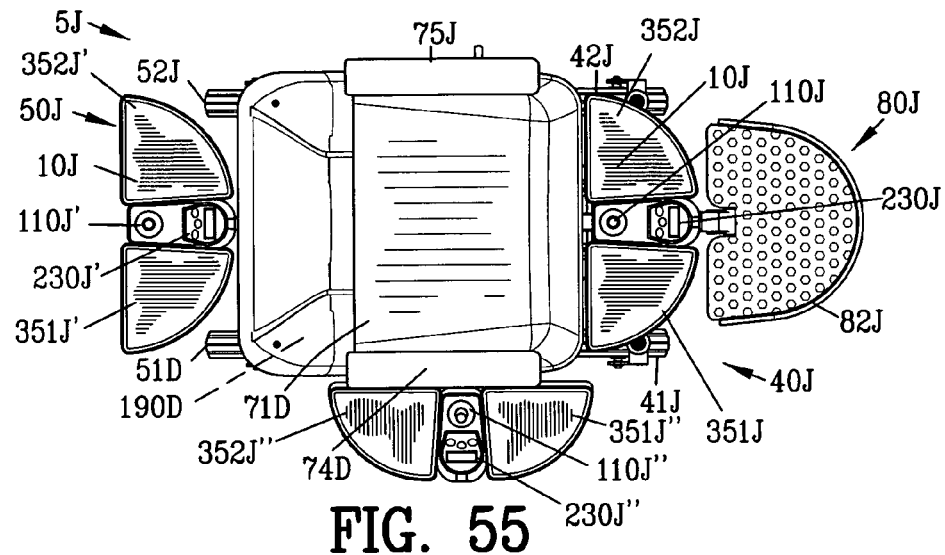
FIG. 55 is a top view of FIG. 54.
Figure 54:
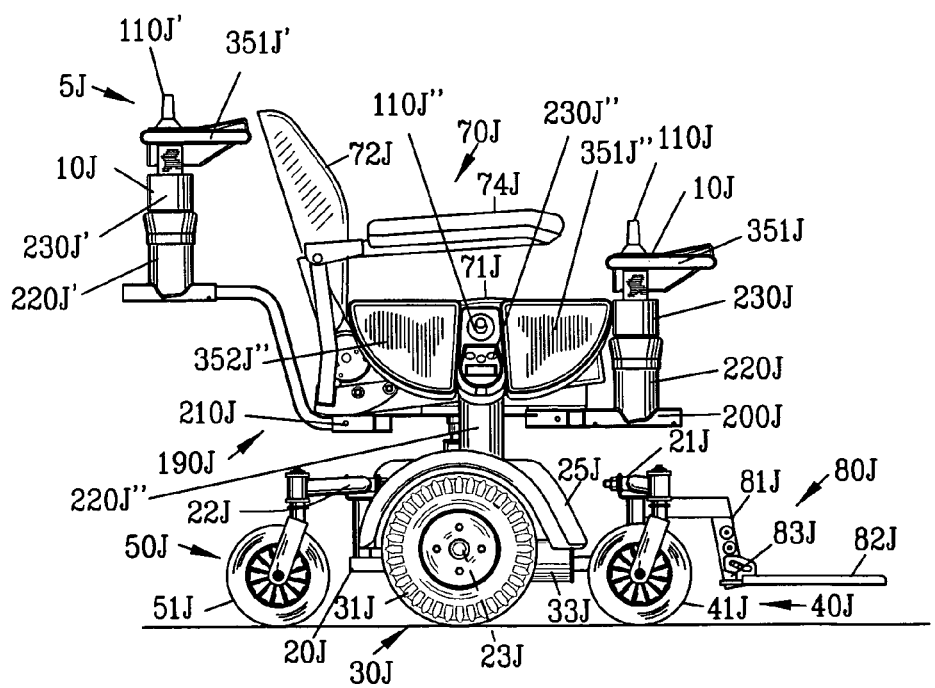
FIG. 54 is a side view of an eleventh embodiment of a personal mobility vehicle incorporating the moveable hand control shown as a joystick assembly.

FIGS. 54 and 55 are views of an eleventh embodiment of a personal mobility vehicle 5J incorporating the moveable hand control shown as a joystick assembly 110J located at multiple locations on the personal mobility vehicle 5J. The joystick assemblies 110J, 110J' and 110J" are inserted into sockets 220J, 220J' and 220J" in a manner similar to FIGS. 42 and 43. The joystick assembly 110J enables the conversion of a conventional power chair into the practice of the present invention.

A conventional power chair may be converted to use the present invention by mounting a base 190J to the chair portion 71J of the conventional power chair to support a socket 220J. The socket 220J is wired to the power chair controller and the conventional joystick 275J is inserted into the joystick assembly 110J as will be described in greater detail hereinafter.

FIGS. 56-62 illustrating various views of the joystick assembly 110J. The rotary coupling 230J extends between a lower end 231J an upper end 232J with the lower end 231J defining a socket insert 234J having a key 235J. The socket insert 234J includes a plurality of stock electrical connectors as previously described.

The upper end 232J of the rotary coupling 230J supports a mounting 280J for receiving the conventional joystick 275J. Optional plural wrist rests 281J and 282J are provided for supporting the wrists of the operator (not shown). Preferably, plural wrist rests 281J and 282J are adjustable is indicated by the arrows.

Figure 60:
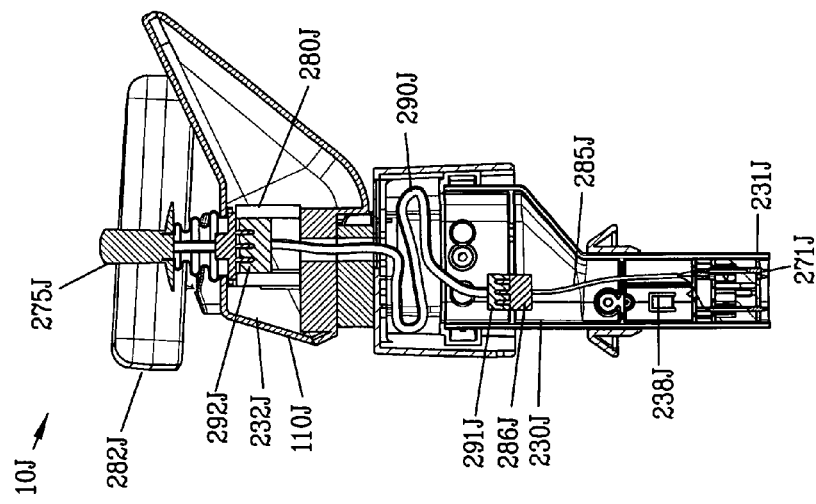
FIG. 60 is an enlarged view of the joystick assembly of FIG. 58.
Figure 61:
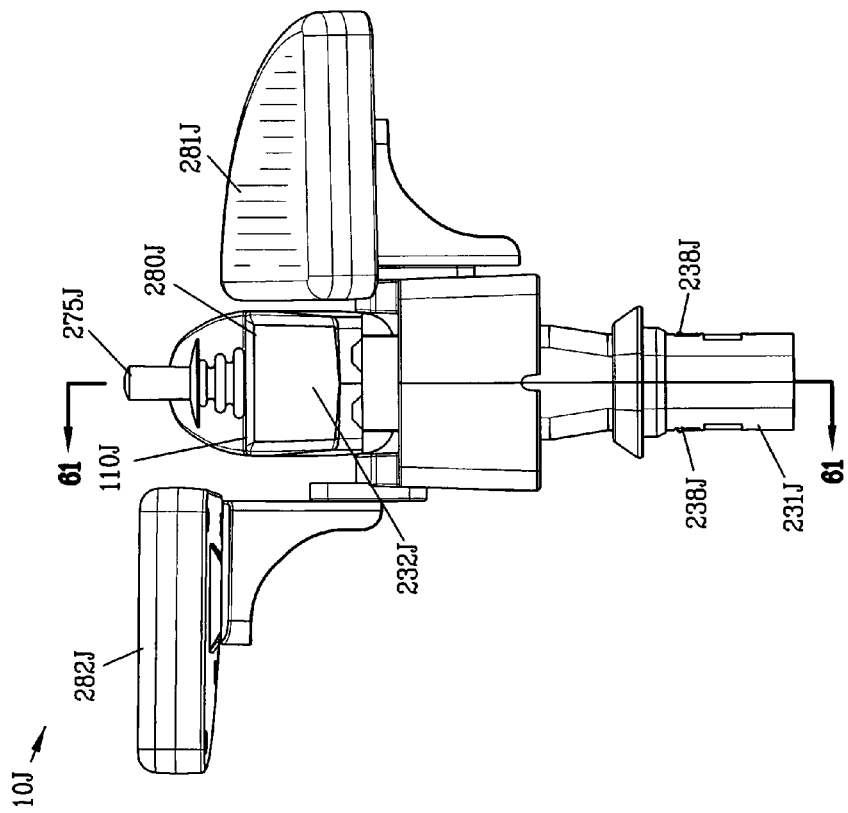
FIG. 61 is a sectional view along line 61-61 in FIG. 60.
Figures 62, 63:
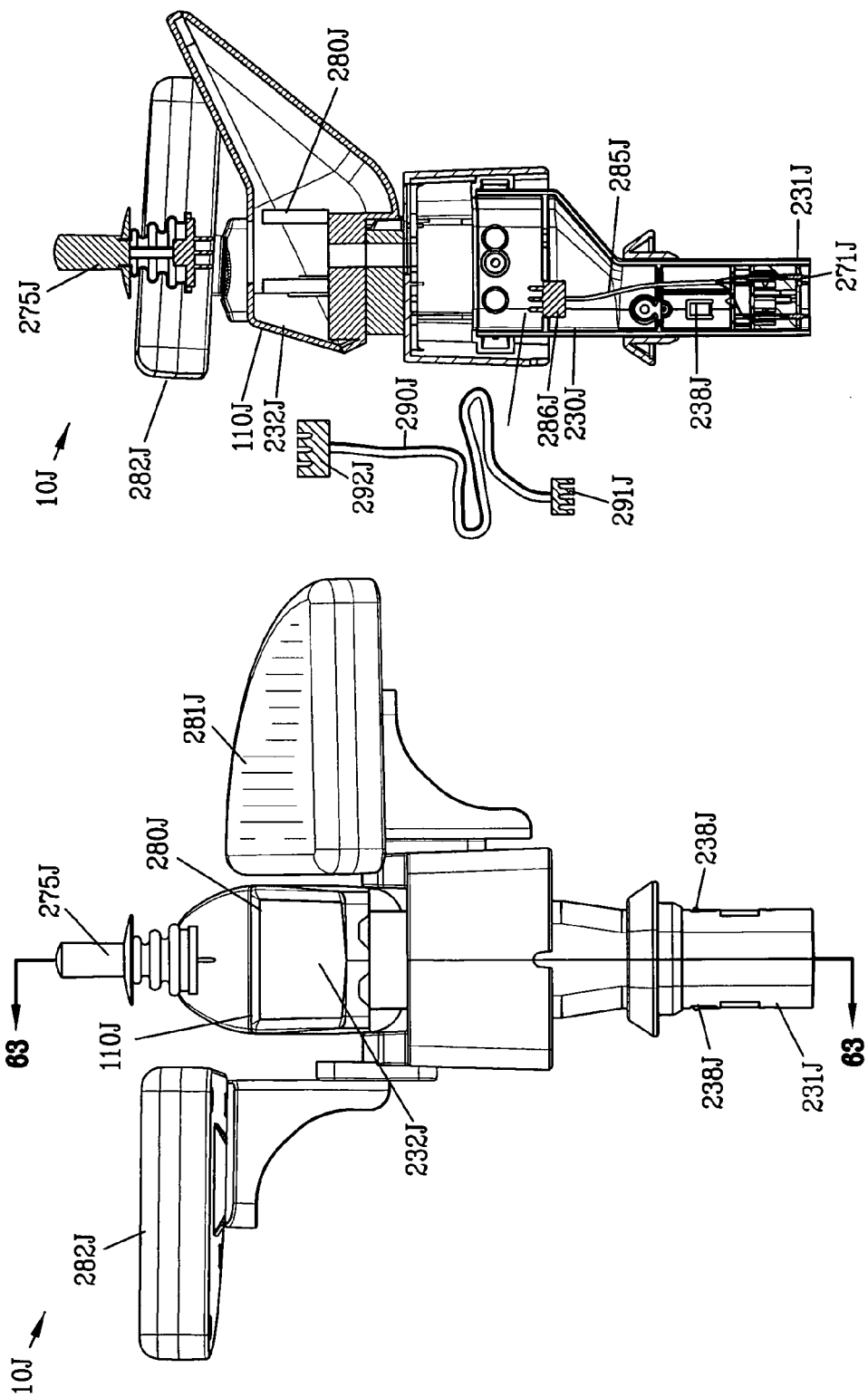
FIG. 62 is a view similar to FIG. 60 with the joystick assembly in an unassembled condition.
FIG. 63 is a sectional view along line 63-63 in FIG. 62.

FIGS. 60 and 61 are enlarged view of the joystick assembly 110J in an assembled condition whereas FIGS. 62-63 are enlarged view of the joystick assembly 110J in an unassembled condition. A conductor harness 285J is connected to the stock electrical connector 271J and terminates in a plug 286J.

An adapter cable 290J extends between a first plug 291J and a second plug 202J. The adapter cable 290J is selected depending upon the type of conventional joystick 275J converting power chair. The first plug 291J and gauges with the plug 286J whereas the second plug 292J engages with pins emanating from the conventional joystick 275J. Various adapter cables 290J may be provided for accommodating for a wide variety of conventional joysticks of the prior art.

Figure 65:
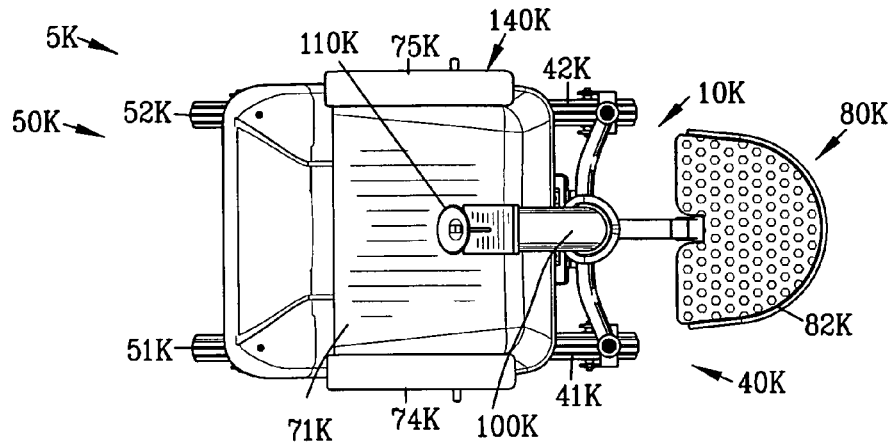
FIG. 65 is a top view of FIG. 64.
Figure 64:
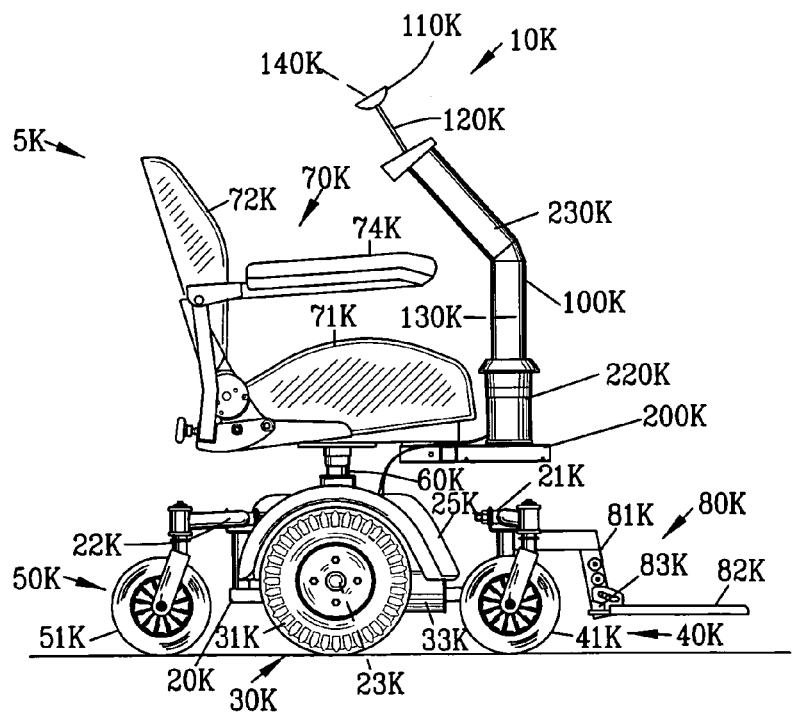
FIG. 64 is a side view of a twelfth embodiment of a personal mobility vehicle incorporating the moveable hand control shown as a chin control.

FIGS. 64 and 65 are views of an twelfth embodiment of a personal mobility vehicle 5K incorporating the moveable hand control shown as a chin control 110K. The chin control 110K is inserted into the socket 220K in a manner similar to FIGS. 42 and 43.

Figure 66:
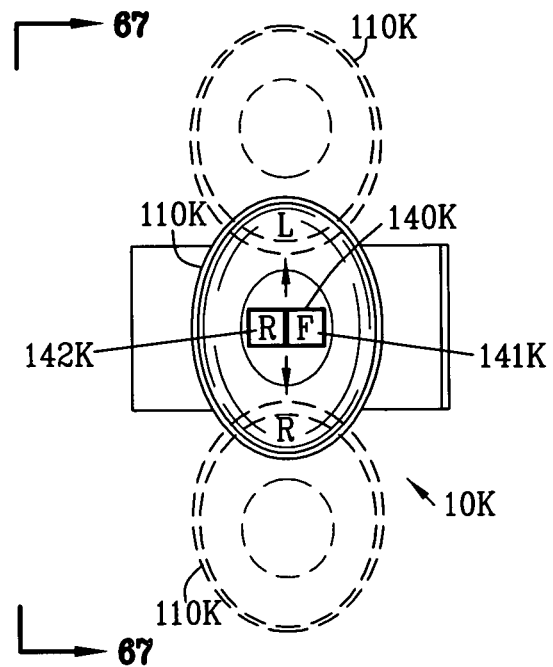
FIG. 66 is an enlarged top view of the chin control of FIG. 65.
Figure 67:
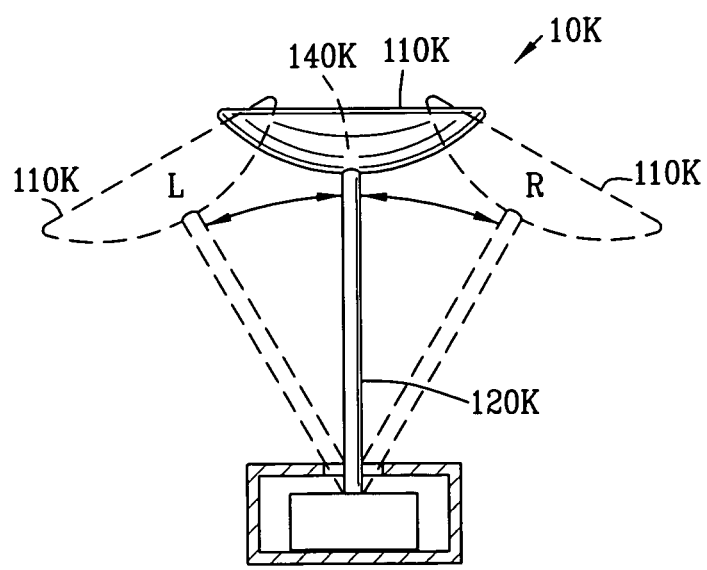
FIG. 67 is a view along line 67-67 in FIG. 66.

FIGS. 66 and 67 are enlarged views of a specialized chin control 110K. The specialized chin control 110K is restricted to movement only in a left and right direction as indicated by the arrows. The left and right movement of the specialized chin control 110K controls the left and right turning of the personal mobility vehicles shown in FIGS. 64 and 65.

The forward-reverse control 140K is located on the specialized chin control 110K. The forward-reverse control 140K comprises a forward speed control button 141K and a reverse-speed control button 142K. The buttons 141K and 142K are pressure sensitive buttons whereby an increased pressure on the respective button results in an increase speed of the personal mobility vehicle. The forward speed control button 141K and a reverse-speed control button 142K are controlled by the chin of an operator. The specialized chin control 110K separates the steering function 110K from the forward-reverse and speed function 140K as previously described.

FIGS. 68 and 69 are views of a thirteenth embodiment of a personal mobility vehicle 5L incorporating the handlebar 110L operated by a linear actuator 300L. The linear actuator 300L raised the handlebar 110L to an operative position and lowers the handlebar 110L to a level substantially equal to the position of the position of the seat 71L. The lowering of the handlebar 110L to a level substantially equal to the position of the position of the seat 71L facilitates ingress and egress of an operator from the personal mobility vehicle 5L.

Figure 71:
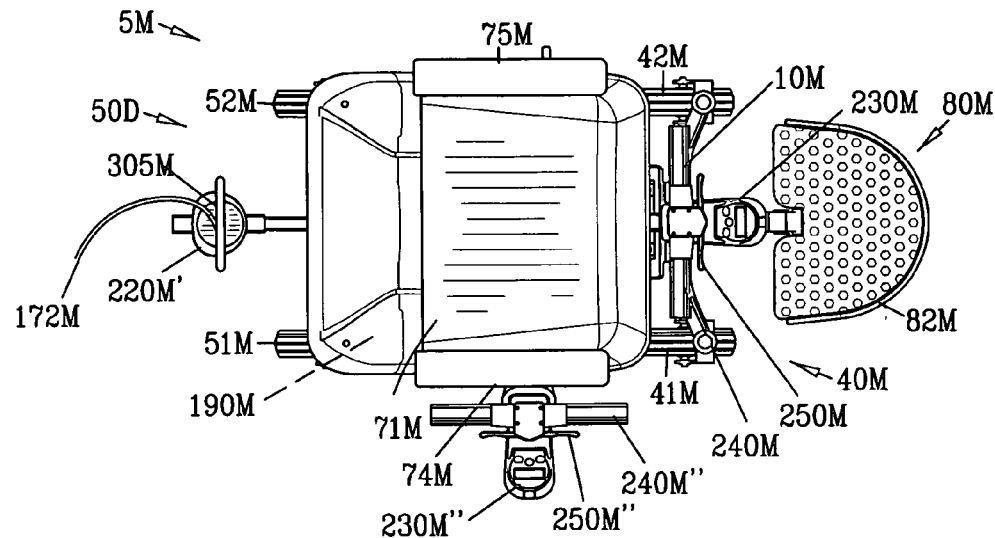
FIG. 71 is a top view of FIG. 70.
Figure 70:
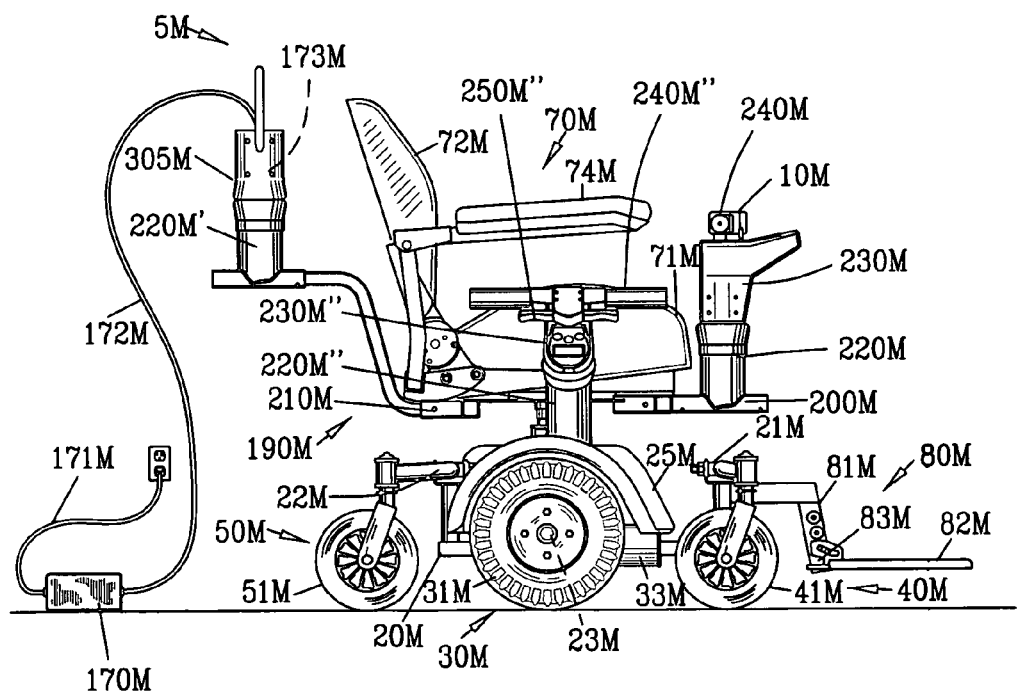
FIG. 70 is a side view of a fourteenth embodiment of the present invention incorporating the universal electrical connector within a power chair personal mobility vehicle.

FIGS. 70 and 71 are views of a fourteenth embodiment of the present invention incorporating the universal electrical connector 305M within a personal mobility vehicle 5M. The insertion of the universal electrical connector 305M into the socket 220M enables the universal electrical connector 305M to charge the batteries in the personal mobility vehicle 5M. All of the sockets 220M on the personal mobility vehicle 5M are able to accommodate any of the moveable hand controls previously described as well as the universal electrical connector 305M.

The personal mobility vehicle 5M is being charged from an AC battery charger 170 having a line cord 171 connected to an AC electrical service and a low voltage cord 172 connected to the universal electrical connector 305M by a plug 173 internal the universal electrical connector 305M.

FIG. 72 is a side view of a fifteenth embodiment with the universal electrical connector 305N of FIGS. 70 and 71 located in a scooter type personal mobility vehicle 5N. The scooter type personal mobility vehicle 5N includes a removable battery 160N.

FIG. 73 is a side view of a sixteenth embodiment with the universal electrical connector 305O of FIGS. 70 and 71 charging the battery 160O removed from the personal mobility vehicle 5N of FIG. 72. An ancillary socket 2200 is connected to the battery 160O for receiving the universal electrical connector 305O. The use of an ancillary socket 2200 is connected to the battery 160O provides the ability to charge a second battery 160 with the use of the universe electrical connector 305O.

FIG. 74 is a side view seventeenth embodiment with the universal electrical connector 305P incorporating a DC to DC converter circuit 175P for charging an electrical device 180P. The DC to DC converter 175P receives 12 volt power through an input line 176P and provides either 12 volts or 24 volts on output line 177P. The DC to DC converter 175P enables the battery 160P to be charged in a moving vehicle such as an automobile through a cigarette lighter voltage source. It should be readily appreciated by those skilled that the universal electrical connector 305P of the present invention may be used to charge all types of electrical devices.

Figure 75:
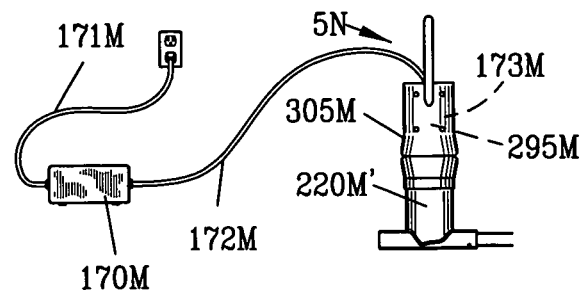
FIG. 75 is a magnified view of a portion of FIG. 70 illustrating the universal electrical connector.

FIG. 75 is a view of a portion of FIG. 70 illustrating the universal electrical connector 305M charging the personal mobility vehicle 5M from an AC electrical service. The universal electrical connector 305M may include an adapter 295M for adapting to receive the various types of plugs 173M on the numerous battery chargers in the art.

Figure 76:
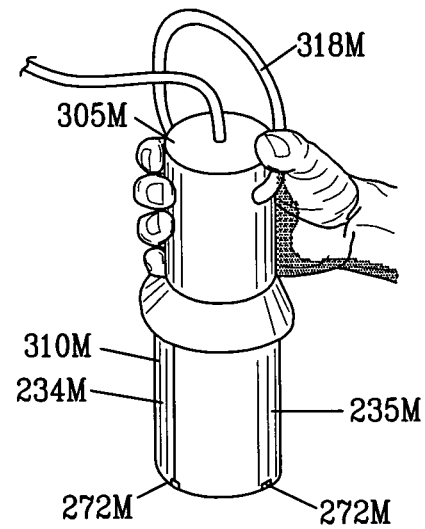
FIG. 76 is an isometric view of an operator inserting universal electrical connector into a socket.
Figure 76:
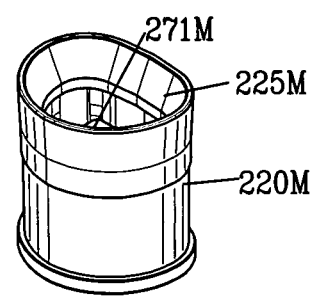

FIG. 76 is an isometric view of an operator inserting universal electrical connector 305M into a socket 220M. The universal electrical connector 305M includes a mast 310M defining a socket inserts 234M having a key 235M to be uniquely received within the socket to 220M. The socket inserts 234M has a plurality of electrical connectors 272M for engaging with the multiple electrical connections 271M of the socket 220M. A handle 318M is provided in proximity to the upper portion the mast 310M for transporting the mast 310M. In the alternative, the handle 318M may be used by an operator for inserting the mast 310M into the socket 220M.

Preferably, the length of the mast 310M is greater than the distance between the index finger and the little finger of the operator. The size of the mast 310M is significant for enabling a visually or physically impaired person to insert the mast 310M into the socket 220M.

Figure 78:
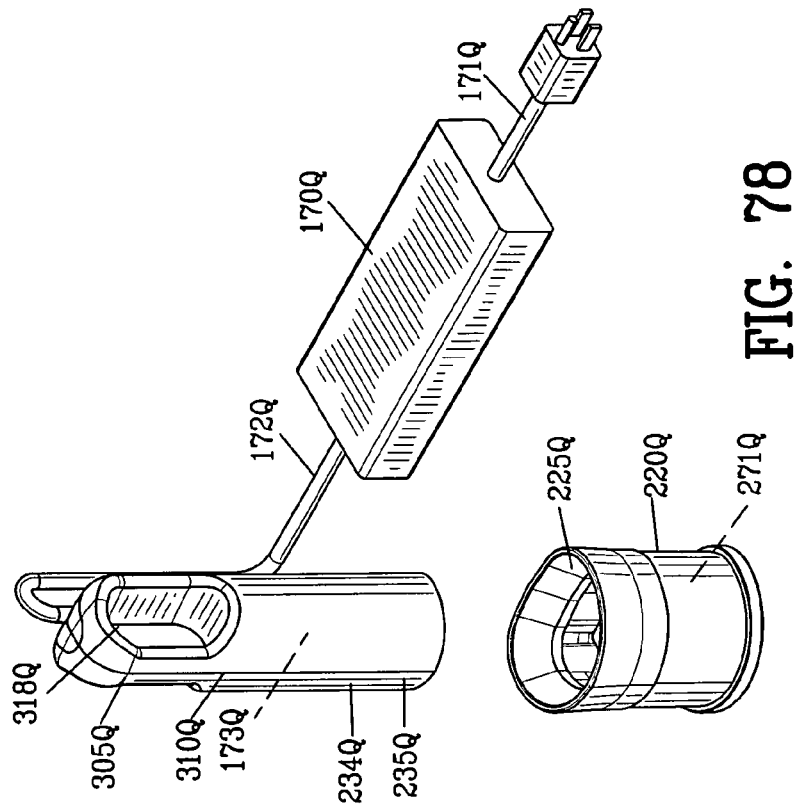
FIG. 78 is an isometric view of the universal electrical connector of FIG. 77 with the mast removed within the socket.
Figure 77:
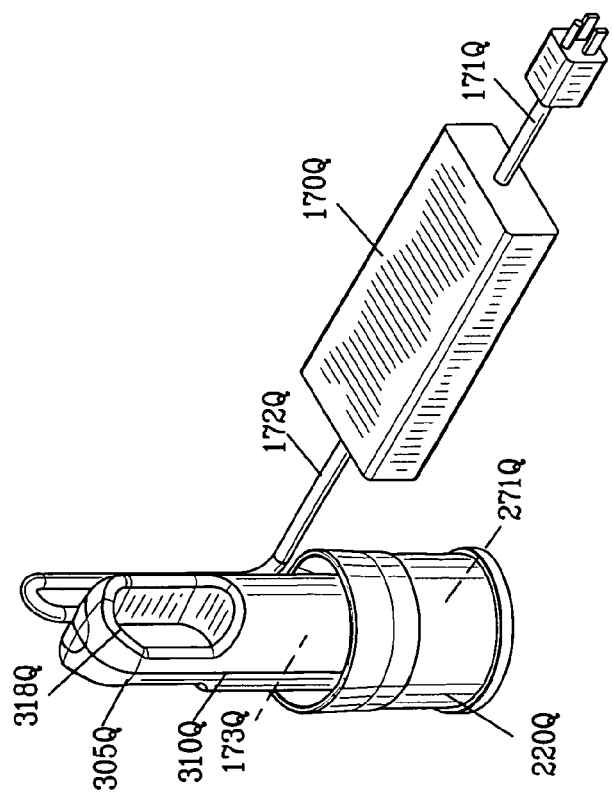
FIG. 77 is an isometric view of an eighteenth embodiment of the universal electrical connector with the mast inserted within a socket.

FIGS. 77 and 78 are isometric views of an eighteenth embodiment of the universal electrical connector 305Q with the mast 310Q inserted within the socket 220Q and the mast 310Q removed from the socket 220Q. The universal electrical connector 305Q is shown connected to an AC battery charger 170Q having a line cord 171Q connected to AC electrical service and a low voltage cord 172Q terminating in a plug 173Q.

FIG. 79 is an isometric cut away view of the interior of the universal electrical connector 305Q of FIGS. 77 and 78. The plug 273Q is fixed in position within the mast 310Q by a plurality of ribs 325Q.

FIG. 80 is an enlarged isometric view the socket 220Q of FIG. 78. In this example, the socket 220Q includes a receptacle 271 Q for receiving the plug 173Q fixed in the mast 310Q. The eighteenth embodiment of the universal electrical connector 305Q provides a more economical solution for charging a variety of electrical devices.

The present invention is suitable for installation on new power chairs and scooters as well as replacements for joysticks on existing power chairs. The subject steering and control assembly provides a more intuitive and easier to use alternative operating system so many more power chair users can maintain their independence despite the onset of age or disability.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A universal steering and charger system for a dual motor vehicle, the dual motor vehicle having a first and a second motor for driving a first and a second drive wheel from a storage battery, comprising:
    a socket having socket terminals located on the dual motor vehicle;
    a coupling defining a socket insert having socket insert terminals;
    a sensor located within said coupling connected to said socket insert terminals;
    a hand control secured to said coupling for enabling an operator to manipulate said sensor;
    said socket insert being receivable within said socket for electrically connecting said socket insert terminals to said socket terminals;
    a motor drive control connected to said socket terminals for powering the first and second motors from the storage battery in accordance with the manipulation of said sensor for steering the dual motor vehicle;
    a mast having mast terminal connected to a low voltage power source; and
    said coupling being removable from said socket for enabling insertion of said mast into said socket for electrically connecting said mast terminals to said socket terminals for charging the storage battery.

2. A universal steering and charger system as set forth in claim 1, wherein said hand control comprises a joystick.

3. A moveable hand control for a dual motor vehicle as set forth in claim 1, wherein said hand control comprises a chin control.

4. A moveable hand control for a dual motor vehicle as set forth in claim 1, wherein said socket comprises a plurality of sockets mounted at multiple locations on the dual motor vehicle.

5. A moveable hand control for a dual motor vehicle, the dual motor vehicle having a first and a second motor for driving a first and a second drive wheel, comprising:
    a plurality of sockets each having socket terminals mounted at multiple locations on the dual motor vehicle;
    a coupling defining a socket insert having socket insert terminals;
    a sensor located within said coupling connected to said socket insert terminals;
    a hand control secured to said coupling for enabling an operator to manipulate said sensor; and
    said socket insert being receivable within one of the plurality of sockets for electrically connecting said socket insert terminals to said socket terminals for powering the first and second motors in accordance with the manipulation of said sensor for steering the dual motor vehicle from multiple location on the dual motor vehicle.

6. A moveable hand control for a dual motor vehicle as set forth in claim 1, wherein said hand control is adapted to be mounted relative to a frame of the dual motor vehicle.

7. A moveable hand control for a dual motor vehicle as set forth in claim 1, wherein said hand control is adapted to be mounted relative to a seat of the dual motor vehicle.

8. A moveable hand control for a dual motor vehicle as set forth in claim 1, wherein said hand control is adapted to be mounted in front of a seat of the dual motor vehicle for enabling an occupant to control the dual motor vehicle.

9. A moveable hand control for a dual motor vehicle as set forth in claim 1, wherein said hand control is adapted to be mounted behind a seat of the dual motor vehicle for enabling an attendant to control the dual motor vehicle.

10. A moveable hand control for a dual motor vehicle as set forth in claim 1, including an independent drive control located on said handlebar for controlling the speed, braking and the forward/reverse direction of the dual motor vehicle.

11. A universal low voltage electrical connector for facilitating connection of a low voltage power source to an electrical device, comprising;
- a socket having a recess defined in said socket;
- a plurality of exposed socket terminals located in said recess;
- a plurality of socket conductors interconnecting said plurality of exposed conductors to the electrical device;
- a mast extending between a lower portion and an upper portion;
- a plurality of exposed mast terminals located in proximity to said lower portion of said mast;
- an electrical joint located in said mast for connecting the low voltage power source to said plurality of exposed mast terminals; and
- said mast dimensioned for enabling the operator to insert said lower portion of said mast into said recess defined in said socket for connecting said plurality of exposed mast terminals to said plurality of exposed socket terminals for connecting the low voltage power source to an electrical device.

12. A universal low voltage electrical connector as set forth in claim 11, wherein said recess of said socket and said lower portion of said mast are keyed for permitting insertion of said mast into said recess defined in said socket in a unique orientation.

13. A universal low voltage electrical connector as set forth in claim 11, wherein said mast extends between said lower portion and said upper portion a distance greater than the palm of the operator for enabling an operator to grasp said mast between the fingers and the palm of the operator for inserting said mast into said recess in said socket.

14. A universal low voltage electrical connector as set forth in claim 11, including a lock for locking said mast within said recess of said socket.

15. A universal low voltage electrical connector as set forth in claim 11, including an enlarged handle secured to said mast dimensioned for grasping said handle between the fingers and the palm of an operator for enabling the operator to insert said lower portion of said mast into said recess of said socket.

16. A universal steering and charger system as set forth in claim 1, wherein said hand control comprises a handlebar.

* * * * *